(12) United States Patent
Yokoyama et al.

(10) Patent No.: US 8,417,815 B2
(45) Date of Patent: Apr. 9, 2013

(54) MANAGEMENT SERVER, CLIENT TERMINAL, TERMINAL MANAGEMENT SYSTEM, TERMINAL MANAGEMENT METHOD, PROGRAM, AND RECORDING MEDIUM

(75) Inventors: Takakazu Yokoyama, Bunkyo-ku (JP); Hiroki Miura, Funabashi (JP); Shinsaku Kita, Kawaguchi (JP); Jyunya Emae, Tokyo (JP); Kouzou Mikami, Tokyo (JP); Satoshi Yonekawa, Tokyo (JP)

(73) Assignee: Canon Denshi Kabushiki Kaisha, Saitama-Ken (JP)

( * ) Notice: Subject to any disclaimer, the term of this patent is extended or adjusted under 35 U.S.C. 154(b) by 0 days.

(21) Appl. No.: 13/349,539

(22) Filed: Jan. 12, 2012

(65) Prior Publication Data
US 2012/0117238 A1     May 10, 2012

Related U.S. Application Data

(60) Division of application No. 12/480,407, filed on Jun. 8, 2009, which is a continuation of application No. PCT/JP2008/071444, filed on Nov. 26, 2008.

(30) Foreign Application Priority Data

Nov. 27, 2007  (JP) .................................. 2007-306247

(51) Int. Cl.
G06F 15/173     (2006.01)
(52) U.S. Cl. ........ 709/225; 709/221; 709/222; 709/228; 709/229

(58) Field of Classification Search .................. 709/221, 709/222, 228, 229
See application file for complete search history.

(56) References Cited

U.S. PATENT DOCUMENTS

| | | | | |
|---|---|---|---|---|
| 5,051,837 A | * | 9/1991 | McJunkin | 725/26 |
| 6,185,514 B1 | * | 2/2001 | Skinner et al. | 702/188 |
| 6,192,361 B1 | * | 2/2001 | Huang | 455/26.1 |
| 6,446,119 B1 | * | 9/2002 | Olah et al. | 709/224 |
| 7,020,628 B2 | * | 3/2006 | Peterson et al. | 705/32 |
| 7,167,919 B2 | * | 1/2007 | Iwamoto et al. | 709/229 |

(Continued)

FOREIGN PATENT DOCUMENTS

| | | |
|---|---|---|
| JP | 2001-282625 | 10/2001 |
| JP | 2003-076447 | 3/2003 |

(Continued)

OTHER PUBLICATIONS

Chinese Office Action dated Jan. 18, 2012 issued in corresponding Chinese Application No. 200880118094.5.

*Primary Examiner* — Backhean Tiv
(74) *Attorney, Agent, or Firm* — Fitzpatrick, Cella, Harper & Scinto

(57) ABSTRACT

A management server which is connected to a plurality of client terminals via a network, includes a storage unit adapted to store a management policy including usage-permitted time periods of the plurality of client terminals, and an application unit adapted to read out from the storage unit the management policy including the usage-permitted time period of the client terminal to be managed, output the readout management policy to the client terminal, and apply the usage-permitted time period to the client terminal, and extends the usage-permitted time period of the client terminal in accordance with a state of the client terminal.

6 Claims, 26 Drawing Sheets

U.S. PATENT DOCUMENTS

| | | | | |
|---|---|---|---|---|
| 7,356,836 | B2 * | 4/2008 | Beilinson et al. | 726/4 |
| 7,428,585 | B1 * | 9/2008 | Owens et al. | 709/223 |
| 7,451,478 | B2 * | 11/2008 | Yang | 726/2 |
| 7,657,448 | B2 * | 2/2010 | Reddy et al. | 705/5 |
| 7,774,363 | B2 | 8/2010 | Lim | 707/781 |
| 7,890,569 | B1 * | 2/2011 | Stahl | 709/202 |
| 2002/0143914 | A1 | 10/2002 | Cihula | 709/223 |
| 2003/0005072 | A1 * | 1/2003 | Olah et al. | 709/213 |
| 2004/0003279 | A1 | 1/2004 | Beilinson et al. | |
| 2005/0166204 | A1 * | 7/2005 | Takatsu et al. | 718/100 |
| 2005/0272475 | A1 * | 12/2005 | Hahn | 455/566 |
| 2006/0168254 | A1 | 7/2006 | Norton et al. | 709/229 |
| 2008/0079536 | A1 * | 4/2008 | Palfi | 340/5.42 |
| 2008/0155538 | A1 * | 6/2008 | Pappas | 718/100 |
| 2008/0243606 | A1 * | 10/2008 | Snyder et al. | 705/14 |

FOREIGN PATENT DOCUMENTS

| | | |
|---|---|---|
| JP | 2004-355450 | 12/2004 |
| JP | 2005-234729 | 9/2005 |
| JP | 2007-102441 | 4/2007 |

* cited by examiner

FIG. 9

PC TIME PERIOD OF USE LIMITATION SETTING

ALERT TIME PERIOD  [10 MINUTES ▽]

☑ SHUT DOWN WHEN COMMUNICATION IS DISABLED   ☐ USE CALENDAR

ONE-PATTERN SETTING

TIME PERIOD OF USE LIMITATION LIST  [▽]

0  2  4  6  8  10  12  14  16  18  20  22  24

DESIGNATE TIME PERIOD : [ : ] ~ [ : ]   [PERMIT USE]   [INHIBIT USE]

FIG. 10

PC TIME PERIOD OF USE LIMITATION SETTING

ALERT TIME PERIOD [10 MINUTES ▽]

☑ SHUT DOWN WHEN COMMUNICATION IS DISABLED  ☑ USE CALENDAR

| BATCH SETTING | DETAILED SETTING | OFFLINE SETTING |

BATCH SETTING

SETTING PERIOD [▽]

☐ MONDAY  ☐ TUESDAY  ☐ WEDNESDAY  ☐ THURSDAY
☐ FRIDAY  ☐ SATURDAY  ☐ SUNDAY

USAGE TIME PERIOD SETTING

USAGE TIME PERIOD LIMITATION LIST [▽]

0 2 4 6 8 10 12 14 16 18 20 22 24

DESIGNATE TIME PERIOD : ~ :

[PERMIT USE]  [INHIBIT USE]

[OK]

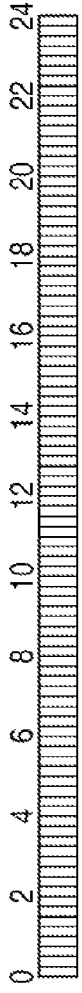

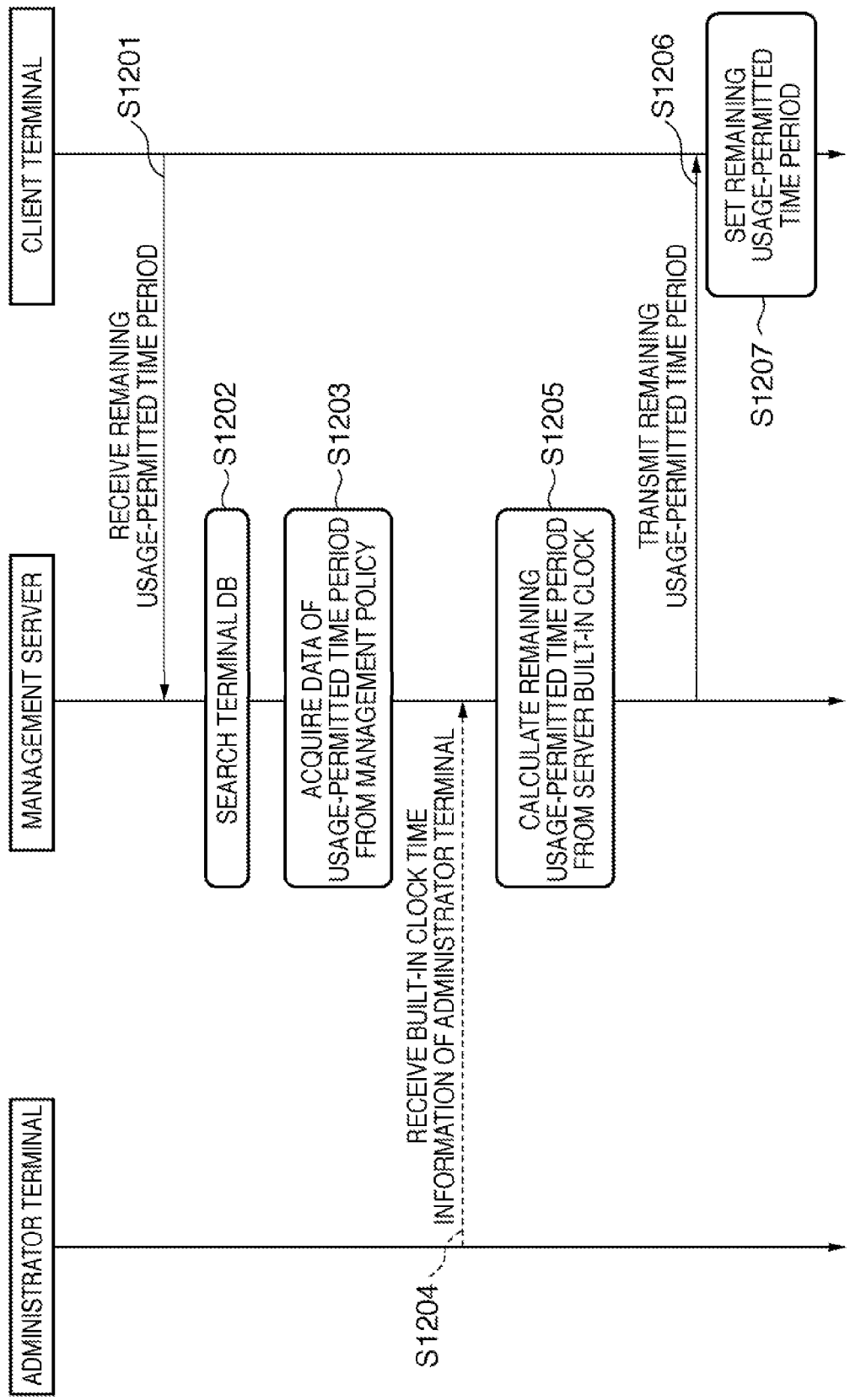

FIG. 14

PC TIME PERIOD OF USE LIMITATION SETTING

ALERT TIME PERIOD [10 MINUTES ▽]

☑ SHUT DOWN WHEN COMMUNICATION IS DISABLED   ☑ USE CALENDAR

| BATCH SETTING | DETAILED SETTING | OFFLINE SETTING |

○ MONDAY    ○ TUESDAY    ○ WEDNESDAY    ○ THURSDAY
○ FRIDAY    ○ SATURDAY    ○ SUNDAY

USAGE TIME PERIOD LIMITATION LIST [▽]

0  2  4  6  8  10  12  14  16  18  20  22  24

DESIGNATE TIME PERIOD : [ : ] ~ [ : ]

[PERMIT USE]  [INHIBIT USE]

[OK]

F I G. 16
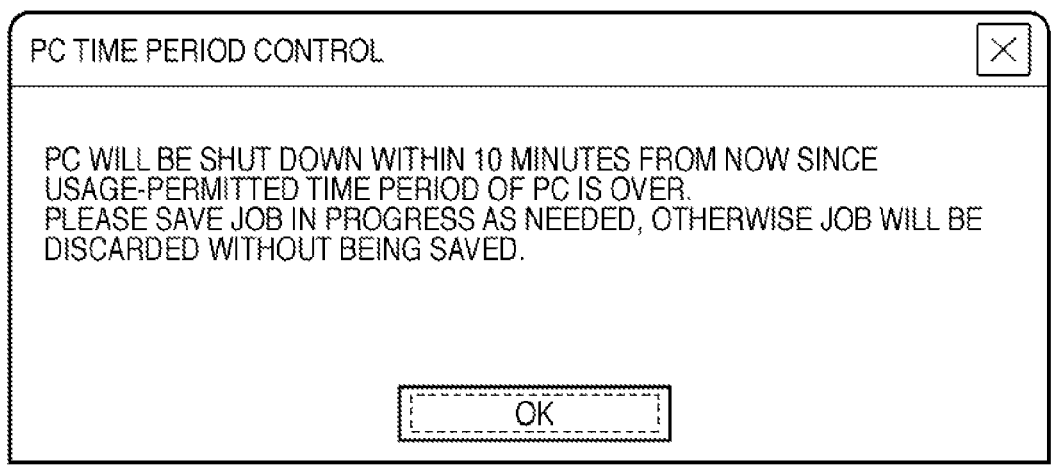
F I G. 17
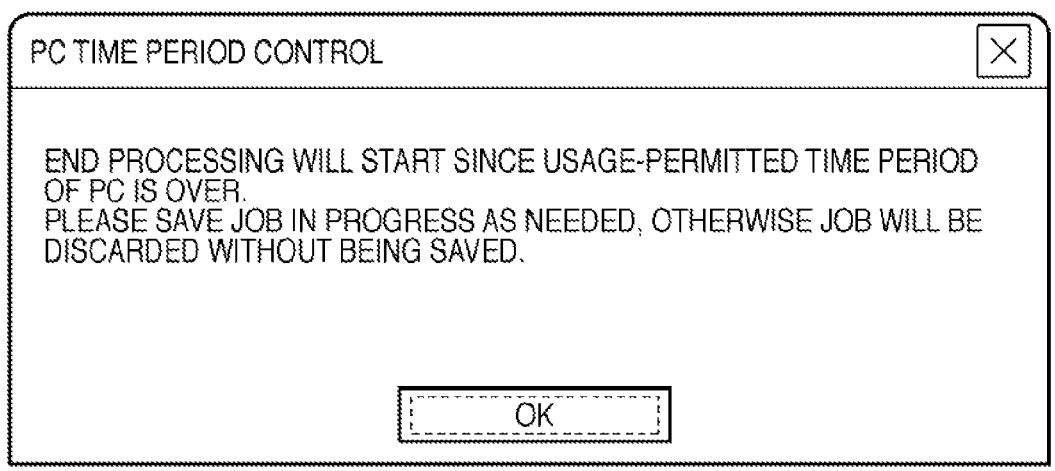

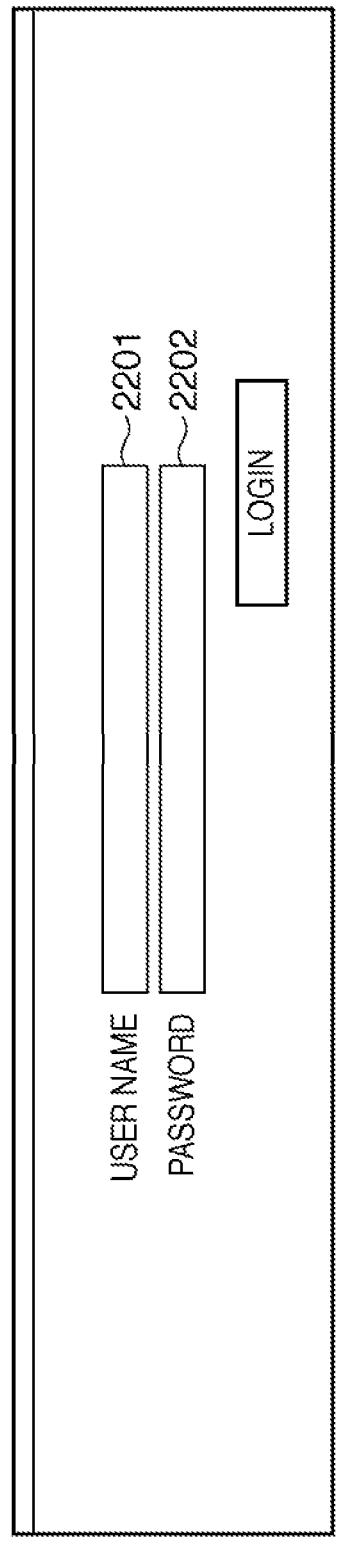

FIG. 23

CURRENT LOGIN USER NAME : admin1　　　LOGOUT (PC TIME PERIOD OF USE LIMITATION: CHANGE OR DELETE BY MANAGEMENT USER)

| | | USER TO BE MANAGED |
|---|---|---|
| START DATE | 2007/07/06 CALENDAR | |
| END DATE | 2007/07/06 CALENDAR | DOMAIN NAME |
| LAST UPDATE USER | | |

DISPLAY MANAGEMENT USER

NO DATA RECORD TO BE DISPLAYED IS FOUND

- BROWSE LOG
- DEVICE TEMPORARY SETTING
- PC TIME PERIOD OF USE LIMITATION
- OPERATION LOG OF ADMINISTRATOR
- CHANGE PASSWORD
- CHANGE SETTING

FIG. 24

CURRENT LOGIN USER NAME : admin1     LOGOUT

- BROWSE LOG
- DEVICE TEMPORARY SETTING
- PC TIME PERIOD OF USE LIMITATION
- OPERATION LOG OF ADMINISTRATOR
- CHANGE PASSWORD
- CHANGE SETTING (OPERATION LOG OF ADMINISTRATOR)

| START DATE | 2007/07/06 | CALENDAR | LOGIN USER NAME | |
| END DATE | 2007/07/06 | CALENDAR | OPERATION NAME | |
| START TIME | ▽ HOUR | ▽ MINUTE | | |
| END TIME | ▽ HOUR | ▽ MINUTE | | |

[DISPLAY LOG] — 2402

Calendar popup (2401):

CALENDAR    □ ×

JULY 2007

| SUN | MON | TUE | WED | THU | FRI | SAT |
|---|---|---|---|---|---|---|
| 24 | 25 | 26 | 27 | 28 | 29 | 30 |
| 1 | 2 | 3 | 4 | 5 | *6* | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1 | 2 | 3 | 4 |

[CALENDAR]

FIG. 27

BASIC MANAGEMENT POLICY DATA LIST

| # | BASIC MANAGEMENT POLICY |
|---|---|
| 1 | 10:00 ~ 19:00 |
| 2 | 8:00 ~ 18:00 |
| 3 | 8:30 ~ 18:30 |
| 4 | 6:00 ~ 16:00 |
| 5 | 8:30 ~ 19:00 |
| 6 | 7:30 ~ 16:30 |

FIG. 28

USAGE LOG LIST OF LAST WEEK

| # | USAGE LOG OF LAST WEEK |
|---|---|
| MON | 8:30 ~ 18:30 |
| TUE | 8:30 ~ 18:45 |
| WED | 8:35 ~ 18:30 |
| THU | 8:40 ~ 18:55 |
| FRI | 8:45 ~ 19:00 |
| SAT | ---------------------------- |

FIG. 29

(WEB ACCESS)

| LOGON NAME | test |
|---|---|
| DOMAIN NAME | sec |
| USER | AUTO USER |
| DEPARTMENT | TEST |
| DATE | 2007/10/20 (TUE) |
| TIME | ALL TIMES |

<PREVIOUS PAGE | NEXT PAGE>

| TIME | URL | WWW HOST IP | METHOD | SEARCH KEYWORD |
|---|---|---|---|---|
| 00:00:00 | http://www.○○○.jp/ | 192.168.1.2 | GET | |
| 04:00:00 | http://www.○○○.jp/ | 192.168.1.2 | GET | |
| 06:00:00 | http://www.○○○.jp/ | 192.168.1.2 | GET | |
| 11:00:00 | http://www.○○○.jp/ | 192.168.1.2 | GET | |
| 13:00:00 | http://www.○○○.jp/ | 192.168.1.2 | GET | SPA |
| 14:00:00 | http://www.○○○.jp/ | 192.168.1.2 | GET | |
| 15:00:00 | http://www.○○○.jp/ | 192.168.1.2 | GET | |
| 20:00:00 | http://www.○○○.jp/ | 192.168.1.2 | GET | |

FIG. 30

| BACK TO MANAGEMENT USER LIST | |
|---|---|
| LOGON NAME | test |
| DOMAIN NAME | sec |
| USER | AUTO USER |
| DEPARTMENT | TEST |
| LAST LOGON PC | |
| LAST LOGON DATE AND TIME | |

| PC USAGE-PERMITTED TIME PERIOD | ☐ CALENDAR<br>[0▽] HOUR [0▽] MINUTE ~ [0▽] HOUR [0▽] MINUTE |
|---|---|
| REGISTERED | (2007/11/01) 08:30 - 12:00<br>(2007/11/01) 15:30 - 23:00 |

CANCEL

MANAGEMENT SERVER, CLIENT TERMINAL, TERMINAL MANAGEMENT SYSTEM, TERMINAL MANAGEMENT METHOD, PROGRAM, AND RECORDING MEDIUM

RELATED APPLICATION

This application is a division of U.S. patent application Ser. No. 12/480,407, filed on Jun. 8, 2009, which is a continuation of International Patent Application No. PCT/JP2008/071444, filed on Nov. 26, 2008, the entire contents of each of which are incorporated by reference herein.

TECHNICAL FIELD

The present invention relates to a management server, client terminal, terminal management system, terminal management method, program, and recording medium and, more particularly, to a technique which restricts a time period of use of a client terminal.

BACKGROUND ART

In various facilities such as public offices, companies, schools, stores, and community facilities, a good many terminals such as personal computers are used. Office staff, company members, and teachers who engage in jobs, and students who do school work are users of these terminals. Most of these client terminals are connected to external networks represented by the Internet in addition to intranets, and are managed by management terminals via servers.

As an arrangement for managing and monitoring such client terminals, for example, a terminal monitoring system in which an administrator sets a management policy that restricts use functions of terminals, and when the system finds a management policy violator, it reports to the administrator is known (see patent reference 1). With this arrangement, a function of cutting off a connection from a client to a network can be implemented by reporting the management policy violator.

In a system that manages client terminals in facilities, an administrator who has expert knowledge about terminals is normally present during a usage-permitted time period prescribed by the facilities in association with use of terminals represented by a help desk or tutor.

However, in these facilities, terminals are often used during a time period when the administrator is absent or after the usage-permitted time period. For example, in a company, an employee may privately use a terminal after office hours.

Also, a terminal which is left ON may be left. In this case, even a relatively secure terminal which requires authentication at the time of startup may be operated by a third party, and inside information stored in the terminal may be leaked.

As a countermeasure against such problem, an arrangement in which a server manages client terminals, and turns off power supplies of terminals at a predetermined time is known (see patent reference 2).

Patent Reference 1: Japanese Patent No. 3904534
Patent Reference 2: Japanese Patent No. 3437176

DISCLOSURE OF INVENTION

Problems that the Invention is to Solve

However, in the terminal management system that restricts power management of terminals like in the above related art, a time period of use in which terminals are required in actual jobs may often be different from a terminal usage-permitted time period set by the administrator. For example, the user may want to use a terminal after the prescribed time period of use or some users may often have different judgments about a usage-permitted time period. However, in the conventional arrangement, since a terminal usage-permitted time period is uniquely set, users' requests cannot be flexibly met. Therefore, the management policy set by the administrator is not always adequate upon carrying out actual jobs.

The present invention has been made in consideration of the aforementioned problems, and has as its object to provide a technique which can flexibly apply optimal management schedules to respective terminals.

Means of Solving the Problems

In order to achieve the above object, a management server according to the present invention comprises the following arrangement. That is, there is provided a management server which is connected to a plurality of client terminals via a network, comprising:

a storage unit adapted to store a management policy including usage-permitted time periods of the plurality of client terminals; and an application unit adapted to read out the management policy including the usage-permitted time period of the client terminal to be managed from the storage unit, output the readout management policy to the client terminal, and apply the usage-permitted time period to the client terminal, wherein the usage-permitted time period of the client terminal is extended in accordance with a state of the client terminal.

Another management server according to the present invention comprises the following arrangement. That is, there is provided a management server which is connected to a plurality of client terminals via a network, comprising:

an accepting unit adapted to accept a setting of a management policy including usage-permitted time periods of the plurality of client terminals;

a storage unit adapted to store the management policy; and an application unit adapted to read out the management policy including the usage-permitted time period of the client terminal to be managed from the storage unit, output the readout management policy to the client terminal, and apply the usage-permitted time period to the client terminal, wherein the accepting unit accepts the setting of the management policy from an external apparatus.

Another management server according to the present invention comprises the following arrangement. That is, there is provided a management server which is connected to a plurality of client terminals via a network, comprising:

a storage unit adapted to store a management policy including usage-permitted time periods of the plurality of client terminals; and an application unit adapted to read out the management policy including the usage-permitted time period of the client terminal to be managed from the storage unit, output the readout management policy to the client terminal, and apply the usage-permitted time period to the client terminal, wherein the management policy includes a total usage-permitted time period that permits use of the client terminals, and when a sum total of time periods of use or a total time period of use during a predetermined period reaches the total usage-permitted time period, the application unit sets the client terminal in an unavailable state by outputting the management policy to the client terminal.

Another management server according to the present invention comprises the following arrangement. That is, there is provided a management server which is connected to a plurality of client terminals via a network, comprising:

a storage unit adapted to store a management policy including usage-permitted time periods of the plurality of client terminals; and an application unit adapted to read out the management policy including the usage-permitted time period of the client terminal to be managed from the storage unit, output the readout management policy to the client terminal, and apply the usage-permitted time period to the client terminal, wherein the storage unit stores a basic management policy table including a plurality of usage-permitted time periods as the management policy, and the application unit selects one of the usage-permitted time periods from the basic management policy table, and applies the selected usage-permitted time period to the client terminal.

Another management server according to the present invention comprises the following arrangement. That is, there is provided a management server which is connected to a plurality of client terminals via a network, comprising:

a reception unit adapted to receive a usage log of the client terminal to be managed from the client terminal;

a recording unit adapted to record the received usage log as a log file;

a calculation unit adapted to calculate a time period of disuse of the client terminal to be managed by analyzing the log file recorded by the recording unit;

a storage unit adapted to store a management policy including usage-permitted time periods of the plurality of client terminals; and an application unit adapted to, when the time period of disuse of the client terminal to be managed exceeds a predetermined time period, read out the management policy including the usage-permitted time period used to shorten a time period of use to be permitted to the client terminal from the storage unit, output the readout management policy to the client terminal, and apply the management policy to the client terminal.

Another management server according to the present invention comprises the following arrangement. That is, there is provided a management server which is connected to a plurality of client terminals via a network, comprising:

a first storage unit adapted to record a usage log of the client terminal via the network, and store the usage log as a log file;

a second storage unit adapted to store a management policy including usage-permitted time periods of the plurality of client terminals; and an application unit adapted to read out the management policy from the second storage unit, output the readout management policy to the client terminal to be managed, and apply the usage-permitted time period to the client terminal.

A client terminal according to the present invention comprises the following arrangement. That is, there is provided a client terminal connected to a management server via a network, comprising:

a reception unit adapted to receive a management policy including a usage-permitted time period of the client terminal from the management server;

an application unit adapted to apply the management policy to the client terminal; and a transmission unit adapted to transmit a usage log of the client terminal to the management server via the network.

A terminal management system according to the present invention comprises the following arrangement. That is, there is provided a terminal management system comprising a management server and a client terminal, which are connected via a network, wherein the management server comprises:

a storage unit adapted to store a management policy including usage-permitted time periods of a plurality of client terminals; and an application unit adapted to read out the management policy including the usage-permitted time period of the client terminal to be managed from the storage unit, output the readout management policy to the client terminal, and apply the usage-permitted time period to the client terminal, the management server extends the usage-permitted time period of the client terminal in accordance with a state of the client terminal, and the client terminal comprises:

a reception unit adapted to receive a management policy including a usage-permitted time period of the client terminal from the management server;

an application unit adapted to apply the management policy to the client terminal; and a transmission unit adapted to transmit a usage log of the client terminal to the management server via the network.

A terminal management method according to the present invention comprises the following arrangement. That is, there is provided a terminal management method by a management server, which is connected to a plurality of client terminals via a network, and comprises storage unit adapted to store a management policy including usage-permitted time periods of the plurality of client terminals, the method comprising:

a step of reading out the management policy including the usage-permitted time period of the client terminal to be managed from the storage unit; and an application step of outputting the readout management policy to the client terminal, and applying the usage-permitted time period to the client terminal, wherein the usage-permitted time period of the client terminal is extended in accordance with a state of the client terminal.

Effects of the Invention

According to the present invention, a technique that can flexibly apply optimal management schedules to respective terminals can be provided.

Other features and advantages of the present invention will become apparent from the following description taken in conjunction with the accompanying drawings. Note that the same reference numerals denote the same or similar components throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 shows an example of a screen used to make a one-pattern setting of a management policy;

FIG. 10 shows an example of a screen used to make a batch setting of a management policy;

FIG. 11 shows an example of a screen used to make a detailed setting of a management policy;

FIG. 12 is a sequence chart showing processes for setting a remaining usage-permitted time period in a client terminal;

FIG. 14 is a view showing an example of a management policy input screen used when a client terminal is in an offline state;

FIG. 16 is a view showing an example of an alert message displayed on a display;

FIG. 17 is a view showing an example of an alert message displayed when an end time of a usage-permitted time period is reached;

FIG. 22 is a view showing an example of an interface that allows a general terminal to access the management server via a Web browser;

FIG. 23 is a view showing an example of a screen used to input the management policy of a client terminal;

FIG. 24 is a view showing an example of a screen that allows the administrator to browse a log associated with input of the management policy by a general terminal;

FIG. 27 is a view showing an example of basic management policy data prepared in advance in the management server;

FIG. 28 is a view showing an example of a usage log of a client terminal, which is acquired from a terminal log database under determination conditions to be described later;

FIG. 29 is a view showing an example of a screen that displays accessed times from a client terminal;

FIG. 30 is a view showing an example of a screen used to set a management policy displayed on the administrator terminal.

BEST MODE FOR CARRYING OUT THE INVENTION

Embodiments according to the present invention will be described in detail hereinafter with reference to the accompanying drawings. However, components described in this embodiment are merely examples, which do not limit the scope of the present invention. All combinations of characteristic features described in the embodiment are not always indispensable to the solving means of the present invention.

First Embodiment

A terminal management system and software included in the system, an administrator terminal, a management server, and a client terminal according to this embodiment will be described in detail below with reference to the accompanying drawings. The terminal management system of this embodiment includes a client terminal, management server, administrator terminal, and general terminal. Note that the client terminal is located at a predetermined place, and the management server is connected to this client terminal via a network to manage and monitor the client terminal. The administrator terminal is a terminal used to operate the management server by an authorized administrator.

(System Arrangement)

Figure 1:
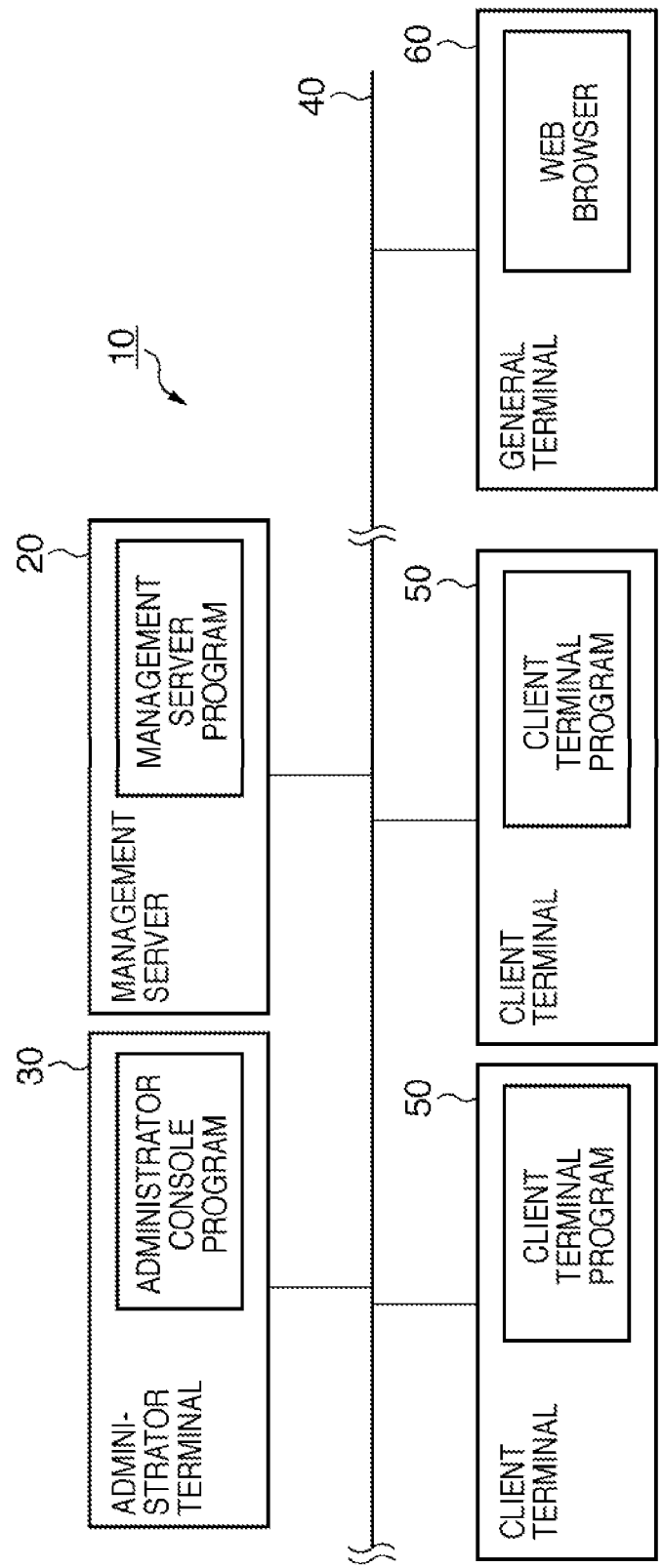
FIG. 1 is a block diagram showing the system arrangement of a terminal management system.

FIG. 1 is a block diagram showing the system arrangement of a terminal management system 10 according to an embodiment of the present invention. As shown in FIG. 1, the terminal management system 10 includes a management server 20, an administrator terminal 30, a plurality of client terminals 50, and a general terminal 60. The management server 20, administrator terminal 30, the plurality of client terminals 50, and general terminal 60 are connected to a network 40 to be able to communicate with each other.

This block diagram shows the arrangement including one management server 20 and one administrator terminal 30 for the sake of simplicity. However, the present invention is not limited to such specific arrangement. For example, as will be described later, either or both of a plurality of management servers 20 and administrator terminals 30 may be arranged depending on the server management mode. Alternatively, the management server 20 and administrator terminal 30 may be implemented by a single apparatus.

The management server 20, administrator terminal 30, client terminals 50, and general terminal 60 are those which run software and programs, and can be implemented by an information processing apparatus represented by a personal computer (PC).

(Hardware Arrangement)

Figure 2:
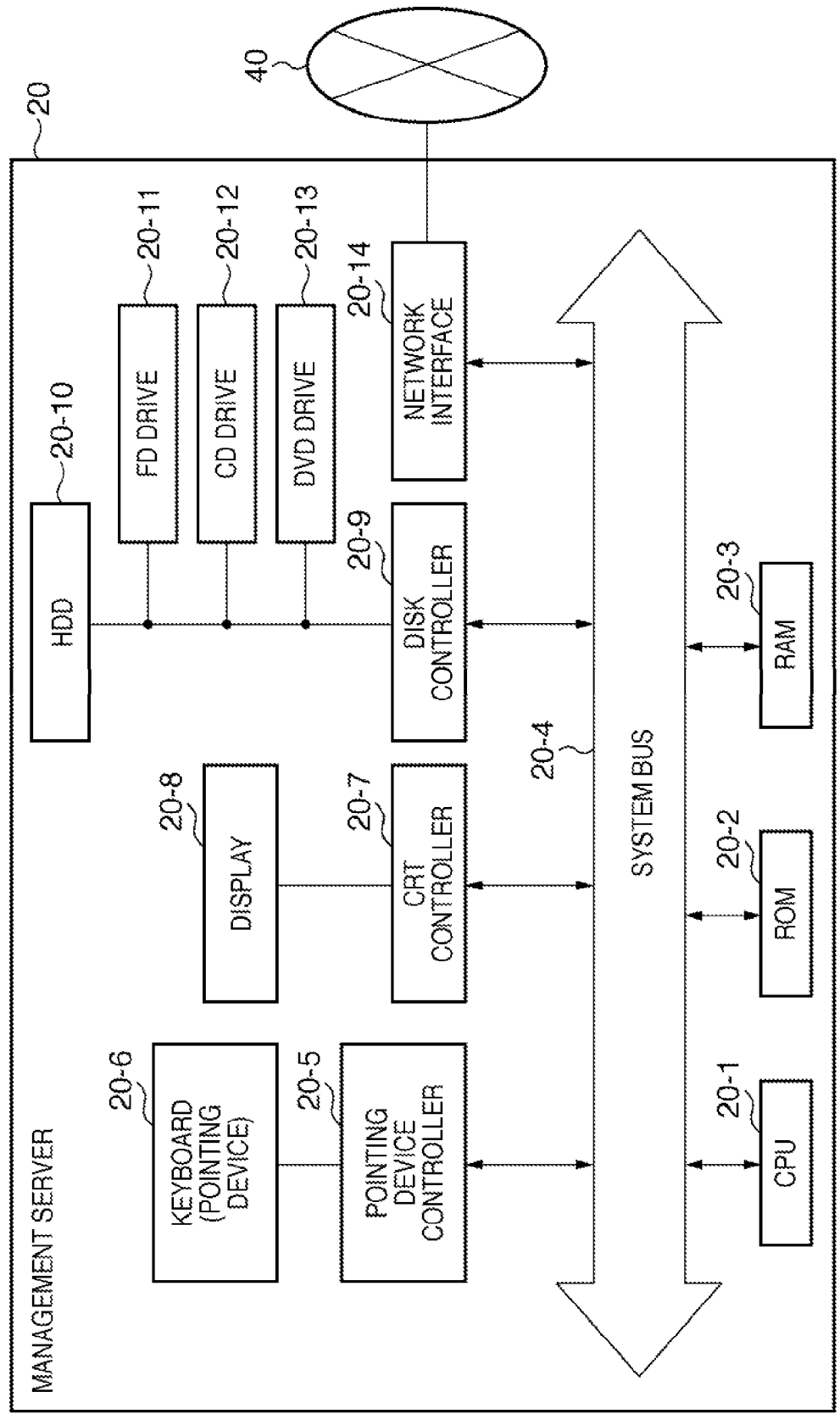
FIG. 2 is a block diagram showing the hardware arrangement of a management server.

The hardware arrangement of each terminal will be described below with reference to FIG. 2. FIG. 2 is a block diagram showing the hardware arrangement required to run software and programs of the management server 20.

Since the administrator terminal 30, client terminals 50, and general terminal 60 have the same arrangements as that shown in FIG. 2, the arrangements will not be illustrated and a description thereof will not be given. Components of each terminal will be referred to hereinafter by giving reference numerals including the same parts after a hyphen as those of reference numerals of corresponding components in the management server 20. For example, when a CPU is to be referred to, since the reference numeral of a CPU of the management server 20 is 20-1, CPUs of the management terminal 30, each client terminal 50, and general terminal 60 will be respectively referred to using reference numerals 30-1, 50-1, and 60-1.

Reference numeral 20-2 denotes a ROM (Read Only Memory), which serves as a read-only memory. Reference numeral 20-3 denotes a RAM (Random Access Memory), which serves as a main memory and work area of the CPU 20-1.

Reference numeral 20-10 denotes an HDD (Hard Disk Drive); 20-11, an FD drive (Flexible Disk drive); 20-12, a CD drive (CD-ROM drive); and 20-13, a DVD drive (DVD-ROM drive).

The management server 20 reads out software stored in the ROM 20-2 or HDD 20-10 or from the FD drive 20-11, CD drive 20-12, or DVD drive 20-13. The CPU 20-1 executes the readout software, and systematically controls respective devices connected to a system bus 20-4.

Reference numeral 20-5 denotes a pointing device controller, which controls an instruction input from a pointing device 20-6 such as a keyboard. The following description will be given using a keyboard as a typical pointing device. However, other devices such as a touch panel may be used in place of the keyboard. Reference numeral 20-7 denotes a CRT controller, which controls display on a display 20-8. Note that the display 20-8 is not limited to a CRT (Cathode Ray Tube) type display. For example, the display 20-8 may be implemented by a liquid crystal panel, organic EL panel, SED (Surface-conduction Electron-emitter Display), or the like.

Reference numeral 20-9 denotes a disk controller, which executes access control with the HDD 20-10, FD drive 20-11, CD drive 20-12, and DVD drive 20-13, which store various files, programs, software, and the like. Data stored in these disks include, for example, a boot program, various applications, edit files, user files, databases, files including management policies, log files, and programs and software installed in each terminal.

A network interface 20-14 exchanges data in two ways with at least one of other terminals, that is, a plurality of terminals including the management server 20, administrator terminal 30, client terminals 50, and general terminal 60 via the connected network 40. In the following description, a main body of execution on hardware on each terminal is a CPU of that terminal (the CPU 20-1 in case of the management server 20).

Each client terminal 50 may have a function of managing a power supply of a personal computer via a network such as "AMT (Active Management Technology)" included in Intel "vPro". The AMT includes a nonvolatile memory which is not cleared even after power OFF. For this reason, even when the power supply of a personal computer is OFF, information required for client management can be confirmed from the administrator terminal via the network. Furthermore, while the power supply is OFF, an external apparatus can instruct to launch an OS or to return from a suspend state, and can control the terminal to execute such an instruction.

Note that each terminal incorporates a clock, and can measure a time. The built-in clock may measure a time using, for example, an oscillation signal of a quartz oscillator.

(Software Configuration of Management Server)

Figure 3:
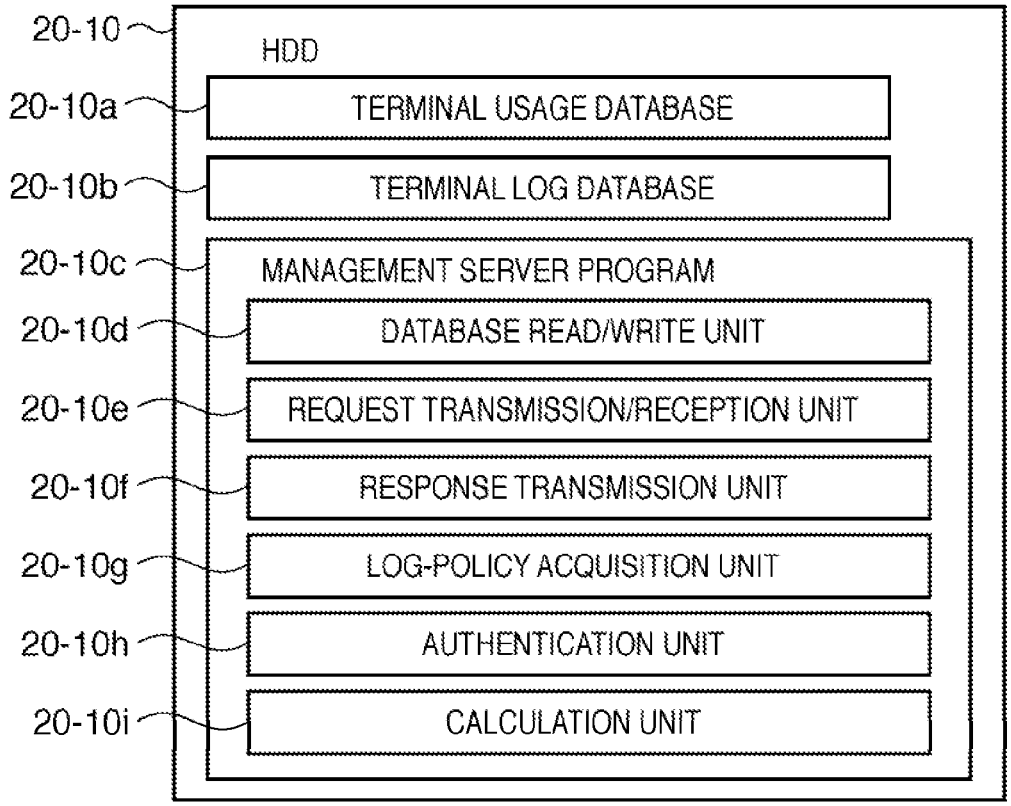
FIG. 3 is a view showing the configuration of a management server program and databases installed in the management server.

FIG. 3 is a view showing the configuration of a management server program 20-10c (software) installed in the HDD 20-10 in the management server 20, and databases 20-10a and 20-10b stored in the HDD 20-10.

A terminal usage database 20-10a (second storage unit) stores data related to the client terminals 50 to be managed by the terminal management system. More specifically, the database 20-10a stores data information used to identify the terminals, and data such as management policies. These data are loaded and added using a database read/write unit 20-10d to be described later. Note that the terminal usage database 20-10a can store determination conditions used to select a management policy. Examples of management policies and determination conditions used to select a management policy will be described below as needed.

A terminal log database 20-10b (first storage unit) stores usage logs of the client terminals 50 in the form of a database of log files. These data are loaded and added using the database read/write unit 20-10d to be described later. Examples of contents recorded as a usage log will be described later.

A management server program 20-10c includes the database read/write unit 20-10d, a request transmission/reception unit 20-10e, a response transmission unit 20-10f, a log-policy acquisition unit 20-10g, an authentication unit 20-10h, and a calculation unit 20-10i. These units can be implemented, for example, in units as software modules.

The database read/write unit 20-10d reads out and writes data from and in the terminal usage database 20-10a and terminal log database 20-10b. The request transmission/reception unit 20-10e receives a request from an external terminal to the management server 20 via the network 40, and transmits a request from the management server 20 to another terminal via the network 40. The response transmission unit 20-10f transmits a response to each terminal.

The log-policy acquisition unit 20-10g automatically acquires (selects) a management policy stored in the terminal usage database 20-10a based on the log data contents in the terminal log database 20-10b.

The authentication unit 20-10h authenticates accesses from the administrator terminal 20, client terminals 50, and general terminal 60 via the network 40 using, for example, IP addresses of the terminals. If authentication has succeeded, the authentication unit 20-10h issues an access permission. Many authentication methods having various security strengths are known. Upon executing the terminal management system 10, an arbitrary authentication method can be used according to the security required for the system.

The calculation unit 20-10i calculates the remaining usage-permitted time period of each client terminal based on a usage-permitted time period in a management policy to be described later, and the built-in clock of the management server 20 or administrator terminal 30.

(Software Configuration of Administrator Terminal)

Figure 4:
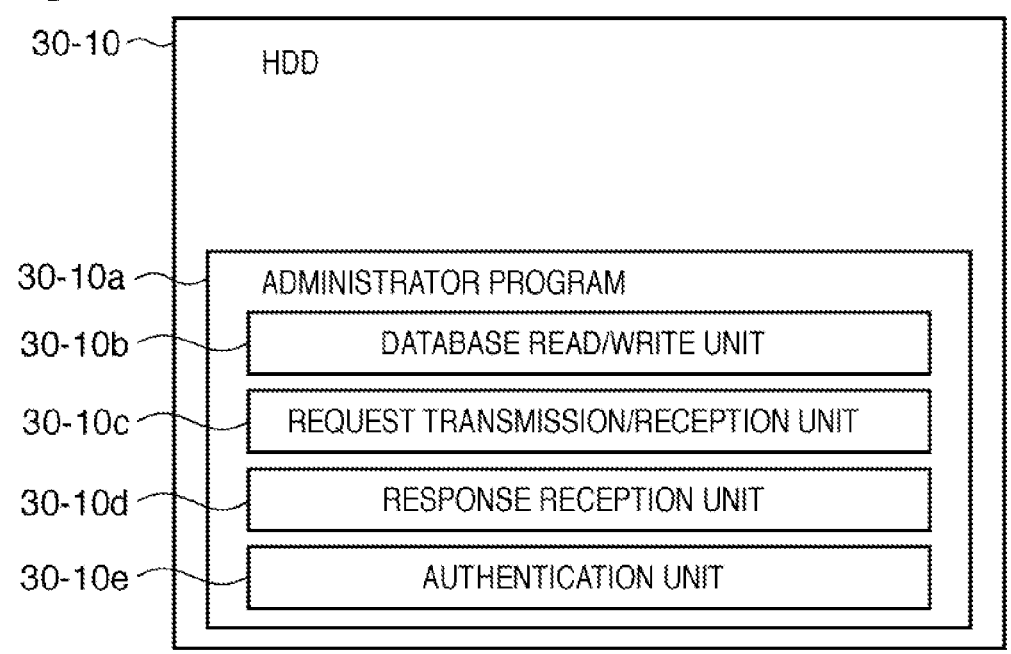
FIG. 4 is a view showing the configuration of an administrator program installed in an administrator terminal.

FIG. 4 is a view showing the configuration of an administrator program (software) installed in an HDD 30-10 in the administrator terminal 30.

An administrator program 30-10a installed in advance in the administrator terminal 30 includes a database read/write unit 30-10b, request transmission/reception unit 30-10c, response reception unit 30-10d, and authentication unit 30-10e to be described below.

The database read/write unit 30-10b mainly reads out and writes data from and in the databases in the management server 20 via the network 40. The request transmission/reception unit 30-10c mainly exchanges a request with the management server 20 via the network 40.

The response reception unit 30-10d mainly receives a response transmitted from the management server 20 via the network 40. The authentication unit 30-10e executes processing for executing authentication using, for example, an IP address of the terminal when the administrator terminal 30 establishes connection to the management server 20. When the authentication has succeeded, an access permission is issued from the management server 20 side.

(Software Configuration of Client Terminal)

Figure 5:
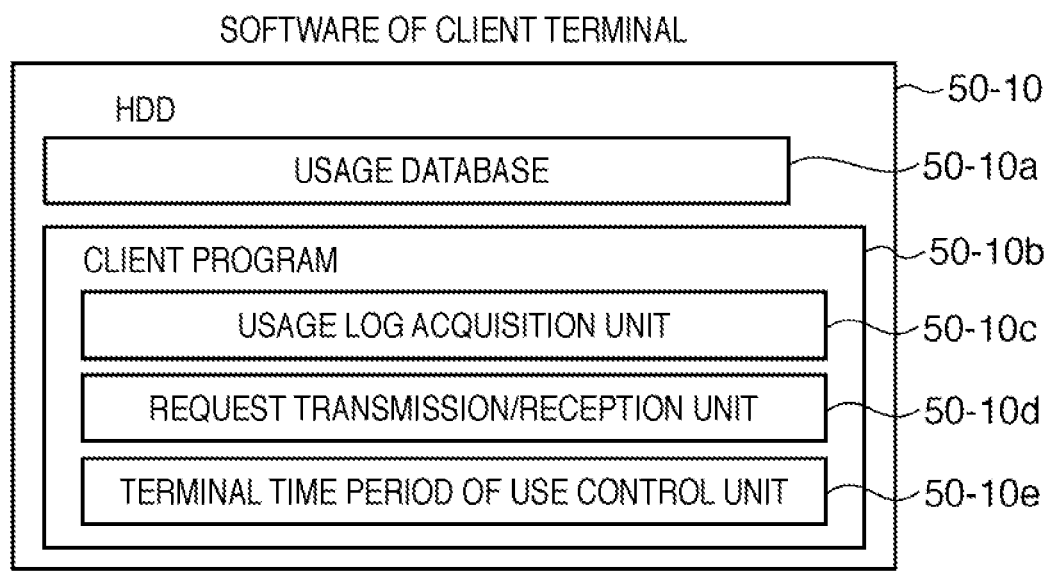
FIG. 5 is a view showing the configuration of a client program and database installed in a client terminal.

FIG. 5 is a view showing the configuration of a client program (software) 50-10b installed in an HDD 50-10 in the client terminal 50, and a stored database 50-10a.

A usage database 50-10a stores a management policy including a usage-permitted time period of that client terminal 50, and data of control contents to be described later. Although details will be described in an embodiment to be described later, a usage-permitted time period repeated every 24 hours or that scheduled using a calendar function is stored.

A client terminal program 50-10b includes a usage log acquisition unit 50-10c, request transmission/reception unit 50-10d, and terminal time period of use control unit 50-10e.

The usage log acquisition unit 50-10c acquires a usage log of the client terminal 50. The contents of the usage log can include records of at least any of operations listed below:

an operation for setting the terminal from an unavailable state to an available state;
an operation for setting the terminal from an available state to an unavailable state;
use of a program;
use of an application;
use of software;
execution of an update file;
access to an external device;
addition or deletion of a software device;
addition or deletion of a hardware device;
transmission/reception of E-mail;
creation of a file;
updating of a file;
deletion of a file;
operation contents of the pointing device; and
change of an extension.

The request transmission/reception unit 50-10d receives a request from the management server 20 and transmits a request to the management server 20 via the network 40. The terminal time period of use control unit 50-10e controls the operations for setting the client terminal 50 from an unavailable state to an available state and from an available state to an unavailable state by reading the contents of the aforementioned usage database 50-10a.

Note that the operation control for setting the unavailable state includes, for example, one or a plurality of operations of a shutdown operation, log-off operation, sleep operation, lock operation, standby operation, and suspend state operation. The management policy describes an operation or operations selected by the management server 20 or administrator terminal 30 of these operations. On the other hand, the operation control for setting the available state includes, for example, one or a plurality of operations of a startup operation, a logon operation, return operation from a sleep state, that from a lock state, that from a standby state, and that from a suspend state, and the management policy describes such operation or operations.

In the following description of this embodiment, assume that the operation for setting the unavailable state is the shutdown operation of the above example, and that for setting the available state is the startup operation of the above example. However, the present invention is not limited to such specific operations.

(Software Configuration of General Terminal)

Figure 6:
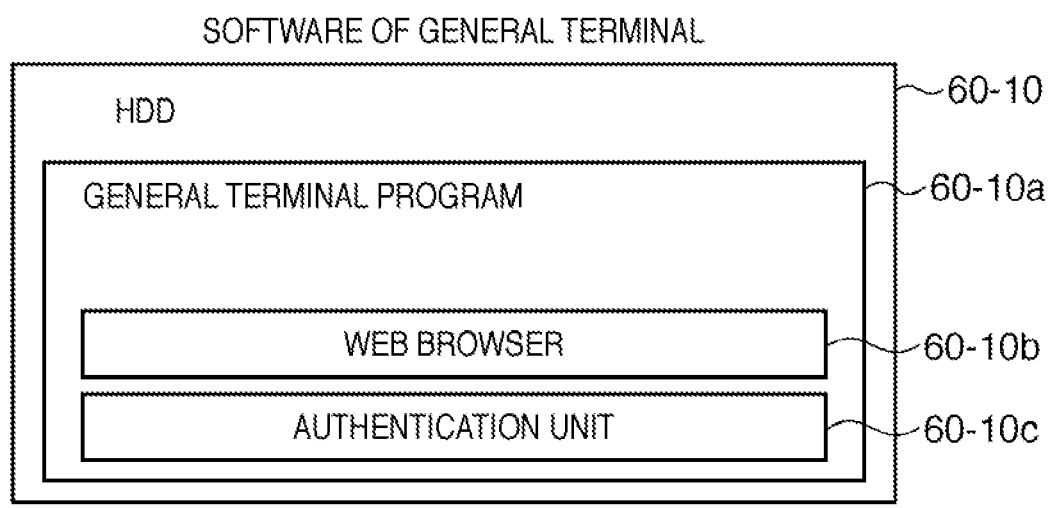
FIG. 6 is a view showing the configuration of a client program installed in a general terminal.

FIG. 6 is a view showing the configuration of a client program (software) installed in an HDD 60-10 in the general terminal 60.

A general terminal program 60-10a includes a Web browser 60-10b and authentication unit 60-10c. The Web browser 60-10a is not a dedicated browser for the terminal management system of this embodiment, but it is browsing software that can browse Web pages described using a markup language represented by an html or xml format. The Web browser 60-10a can use a browser which is prevalently used in personal computers.

The authentication unit 60-10c executes authentication when the general terminal 60 establishes connection to the management server 20 via the network 40. Details will be described later in the third embodiment.

Note that in this embodiment, the authentication unit executes authentication using an IP address of a terminal as an example. However, the present invention is not limited to this. For example, authentication may be implemented using, for example, a model number of a terminal, a hardware number in a terminal, or an ID and password input by the user, or authentication information may be loaded from an IC card or ID card via a device and authentication may be implemented based on that authentication information.

In the following description of this embodiment, the management policy describes information associated with a usage-permitted time period applied to each client terminal, but it may describe other kinds of information. For example, the management policy may include information associated with control of an external network connection of each client terminal, devices such as a removable device, transmission/reception of data, and a file manipulation. In this embodiment, a detailed description of such kinds of information will not be given.

(Overview of Management Policy Setting)

The processing contents to be executed by the arrangement according to the first embodiment of the present invention will be described in detail below with reference to the drawings.

Note that the "management policy" in this embodiment and subsequent embodiments is data including a management schedule stored in the database of the management server 20, as will be described later. The management policy describes information such as a usage-permitted time period in a specific client terminal. More specifically, the management policy can include the following contents:

a start time of a usage-permitted time period;
an end time of a usage-permitted time period;
processing to be executed by the client terminal 50 at a use end time;
processing to be executed by the client terminal 50 at a use start time; and
identification information of the administrator and terminal, which are permitted to set the management policy itself.

The aforementioned contents of the management policy are an example, and do not restrict or limit the range of the management policy of this embodiment. Operation control and management items and contents, which are included in the management policy in common-sense terms or are known to those who are skilled in the art in association with other items and contents may be described in the management policy.

In order to permit use of the client terminal 50 more than necessary, a management policy which limits the operation of that client terminal 50 when a total time period of use of the client terminal 50, that is, the sum total of time periods of use or a total time period of use during a given period reaches a predetermined time period may be set. Such management policy can describe a limitation on a total time period of use of each individual client terminal 50, that on a total of time periods of use of the client terminals 50 included in a predetermined group, and the like. More specifically, upon limiting the total time period of use of each individual client terminal 50, a time period available per day may be limited to six hours, or that available per month may be limited to 180 hours. Also, upon limiting the total of time periods of use of the client terminals 50 included in a predetermined group, a total of time periods of use per day of the client terminals 50 included in that group may be limited to 18 hours. Note that the group of the client terminals 50 can be a set of all client terminals which belong to a group such as a department of an organization.

By limiting the total time period of use of the client terminal 50, whether or not one can perform a job within a time period determined in an organization such as a company can be automatically detected. Even in a workplace adopting a flextime system, a time period of use limitation can be similarly applied. Furthermore, overtime hours can be easily checked.

Figure 7:
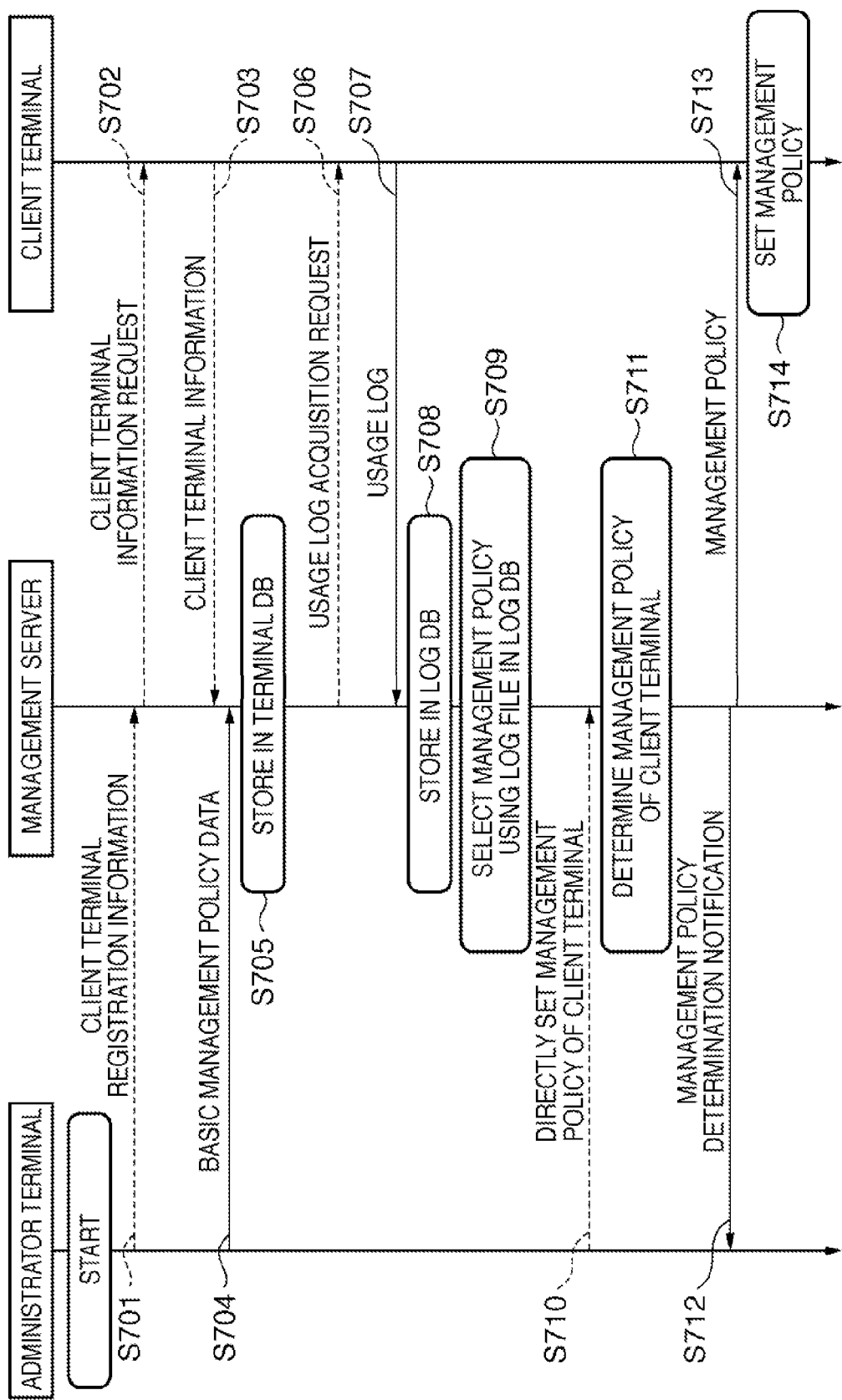
FIG. 7 is a sequence chart showing the sequence until processing for setting a management policy of a client terminal.

FIG. 7 is a sequence chart showing the sequence until processing for setting a management policy of the client terminal 50 in the first embodiment of the present invention.

The aforementioned programs and databases are installed in advance in the HDDs of the management server 20, administrator terminal 30, client terminals 50, and general terminal 60. Such installation can be implemented by known methods such as reading out the programs from media such as an FD, CD, DVD, and storage device, or online downloading.

The above installation sequence may be executed using the aforementioned authentication unit 20-10h in the management server 20 together with the following execution sequence.

Initially, the administrator terminal 30 registers the client terminals 50 to be managed using the read/write unit 30-10d in the terminal usage database 20-10a in the management server 20 (step S701). That is, the administrator terminal 30 transmits client terminal registration information including identification information of each client terminal 50 to the management server 20, thus registering the client terminal 50 to be managed. This processing can be made according to, for example, an instruction input from the administrator to the administrator terminal 30.

Upon reception of the client terminal registration information from the administrator terminal 30, the management server 20 requests the client terminal 50 to be managed to transmit client terminal information using the request transmission/reception unit 20-10e (step S702). That is, the management server 20 transmits a client terminal information request to the client terminal 50.

Note that the client terminal information is identification information that allows the management server 20 to uniquely identify the client terminal 50 or the user of that client terminal 50. For example, as the client terminal information, an ID assigned to the client terminal 50, a number uniquely given to the client terminal 50, or an account name at the time of use of the terminal can be used. In this step, a method that allows the management server 20 to uniquely identify the client terminals 50 or their users may be used, but a detailed description thereof will not be given.

Upon reception of the request from the management server 20 using the request transmission/reception unit 50-10d, the client terminal 50 returns the client terminal information to the management server 30 (step S703).

Note that when the information of the client terminal 50 to be managed has already been registered on the management database of the management server 30, steps S701 to S703 above are omitted.

The administrator terminal 20 transmits basic management policy data for the client terminal 50 to the management server 30 using the request transmission/reception unit 30-10c (step S704). The basic management policy data has contents used as a template of the aforementioned management policy, and describes a policy candidate to be applied to the client terminal in practice. For example, several types of basic management policy data in which a usage-permitted time period to be applied to the client terminal is set to range from 8:00 to 17:00, from 9:00 to 18:00, and the like are prepared.

Upon reception of the basic management policy data, the management server 30 stores the basic management policy data in the terminal usage database 20-10a using the database read/write unit 20-10d (step S705). As will be described later, upon reception of a usage log from the client terminal 50, the management server 30 automatically selects the basic management policy data based on the contents of that usage log.

The management server 20 then requests the client terminal 50 to acquire a usage log using the request transmission/reception unit 20-10e (step S706). Upon reception of this request using the request transmission/reception unit 50-10d, the client terminal 50 transmits the contents of the usage log acquired from the usage log acquisition unit 50-10c to the management server 20 (step S707).

Upon reception of the usage log, the management server 20 stores the contents of the received usage log of the client terminal 50 in the terminal log database 20-10b using the database read/write unit 20-10d (step S708).

The storage timings of the usage log in the terminal log database in steps S706 to S708 can be arbitrarily set. For example, after management policy determination to be described later, that storage operation may be executed at given time intervals. For example, the processing is executed every 5 minutes according to the contents of steps S706 to S708 for the active client terminal 50, thus managing the usage contents of the client terminal 50 by the management server 20.

The management server 20 automatically selects a management policy from the basic management policy data stored in the terminal usage database 20-10a based on the log file in the terminal log database 20-10b (step S709). The selected management policy is stored in the terminal usage database 20-10a. Note that how to select the management policy will be described later.

More specifically, for example, the management server 20 reads operation time zones of the client terminal 50 from the log file. At this time, assume that time zones in which a plurality of document files related to jobs are continuously active without any time gap of 10 minutes or more are that from 8:30 to 12:15, and that from 13:00 to 17:20. In this case, a management policy including a usage-permitted time period having these time zones as the center can be selected from the basic management policy data of the client terminal 50.

At this time, the administrator terminal 30 may directly set a usage-permitted time period in a management policy of the client terminal 50 via the network 40 of the terminal log database 20-10b in accordance with an administrator's instruction (step S710).

In this way, the method of setting a usage-permitted time period in a management policy includes a method of automatically setting a usage-permitted time period by the management server based on a log file (S709) and a direct setting set by the administrator terminal (S710). That is, several types of settings are available in association with a usage-permitted time period in a management policy, and the management policy is automatically selected in case of selection from the basic management policy data based on the aforementioned log, or it is selected by the administrator terminal in case of the direct setting. Note that a one-pattern setting, batch setting, and detailed setting as examples of the direct setting will be described below.

[One-Pattern Setting]

FIG. 9 shows an example of a screen used to make a one-pattern setting of a management policy. The one-pattern setting of a management policy is to repetitively apply the setting of an identical time period of use everyday as the management policy of each client terminal 50 during a period set by the administrator terminal 30 or management server 20.

[Batch Setting]

FIG. 10 shows an example of a screen used to make a batch setting of a management policy. The batch setting of a management policy is to apply, after a period is set by the administrator terminal 30 or management server 20, a setting according to the days of week in the period as the management policy of each client terminal 50. That is, the batch setting is to apply settings for respective days of week together.

For example, assume that the administrator terminal 30 or management server 20 sets a usage-permitted time period on Monday to be "9:00 to 18:00". In this case, until the due date set by the administrator terminal 30 or management server 20, the setting "9:00 to 18:00" is applied as the usage-permitted time period of each client terminal 50 every Monday.

[Detailed Setting]

FIG. 11 shows an example of a screen used to make a detailed setting of a management policy. The detailed setting is to set a usage-permitted time period for each day by the administrator terminal 30 or management server 20. Unlike the one-pattern setting, the administrator terminal 30 or management server 20 can set a usage-permitted time period for each day in place of repetition of an identical setting.

A screen that allows the administrator terminal 30 to directly set a management policy will be further exemplified below. FIG. 29 is a view showing a screen which is accessible from the administrator terminal 30, and displays accessed times and the like, as an example of a screen that displays times of operations and the like of each client terminal 50. FIG. 30 is a view showing an example of a screen which is displayed on the administrator terminal 30 and is used to set a management policy.

The description will revert to FIG. 7. After the administrator terminal 30 or management server 20 determines the management policy of each client terminal 50, the management server 20 stores the management policy in the terminal usage database 20-10a in association with the target client terminal 50 (step S711).

The management server 20 notifies the administrator terminal 30 of determination of the management policy associated with the client terminal 50 using the response transmission unit 20-10f (step S712). Furthermore, the management server 20 transmits (outputs) the management policy to the client terminal 50 using the response transmission unit 20-10f (step S713). The client terminal 50 receives this management policy, and sets it in the usage database 50-10a (step S714).

This management policy for the client terminal 50 is also stored in the terminal usage database 20-10a in the management server 20. After that, another management policy is applied to the acquired usage-permitted time period until the database is updated.

Note that the management policy can also freely set at least one operation of creation of a new document, and initialization, re-setting, and changing of the contents by the administrator terminal 30 or management server 20.

(Management Policy Setting Processing)

Figure 8:
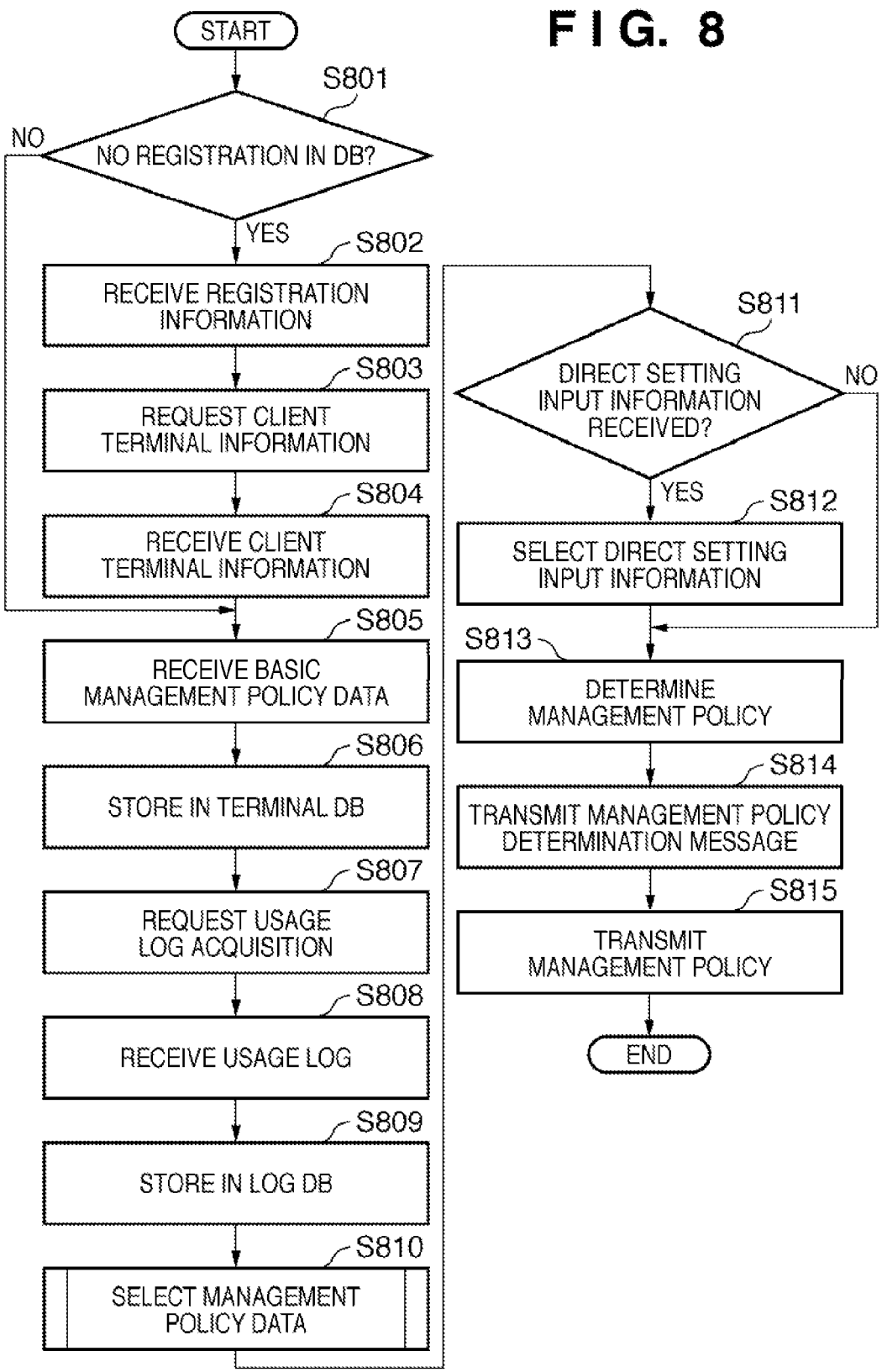
FIG. 8 is a flowchart showing the sequence of the operation of the management server until processing for setting a management policy of a client terminal.

The operation of the management server 20 will be described below with reference to FIG. 8. FIG. 8 is a flowchart showing the sequence of the operation of the management server 20 until processing for setting the management policy of the client terminal 50. The processes of respective steps in FIG. 8 are executed under the control of the CPU 20-1 of the management server 20, and the same applies to other processes by the management server 20 to be described below with reference to the flowcharts unless otherwise specified.

The management server 20 checks in step S801 whether or not client information of the client terminal 50 to be managed is registered in the terminal usage database 20-10a.

If no client information of the client terminal 50 to be managed is registered in the terminal usage database 20-10a (YES in step S801), the process advances to step S802; otherwise (NO in step S801), the process jumps to step S805.

In step S802, the management server 20 receives client terminal registration information from the administrator terminal 30 (step S802). Then, the management server 20 requests the client terminal 50 to be managed to send client terminal information (step S803). Upon reception of the client terminal information from the client terminal 50 (step S804), the process advances to step S805.

In step S805, the management server 20 receives basic management policy data as a template of a management policy from the administrator terminal 30 (step S805). Next, the management server 20 stores the basic management policy data received in step S805 in the terminal usage database 20-10a (step S806).

The management server 20 transmits a usage log acquisition request to the client terminal 50 (step S807). Since the client terminal 50 returns a usage log upon reception of the usage log acquisition request, the management server 20 receives the usage log from the client terminal 50 in step S808.

The management server 20 stores the received usage log in the terminal log DB 20-10b (step S809). The management server 20 selects a management policy from the basic management policy data based on that usage log(step S810). Details of the processing for selecting a management policy (management policy selection processing) will be described later.

The management server 20 checks in step S811 if direct input information of a management policy of the client terminal 50 is received from the administrator terminal 30. If the direct input information is received (YES in step S811), the management server 20 selects the direct input information as a management policy in place of the management policy selected in step S810 (step S812). The management server 20 determines the selected management policy, and stores it in the terminal usage DB 20-10a (step S813).

On the other hand, if direct input information of a management policy of the client terminal 50 is not received from the administrator terminal 30 (NO in step S811), the management server 20 determines to use of the management policy selected in step S810. The management server 20 stores that management policy in the terminal usage DB 20-10a (step S813).

In step S814, the management server 20 transmits a management policy determination message to the administrator terminal 30. Then, the management server 20 transmits the determined management policy to the client terminal 50 (step S815). The management server 20 ends the processing.

(Management Policy Selection Processing)

Figure 26:
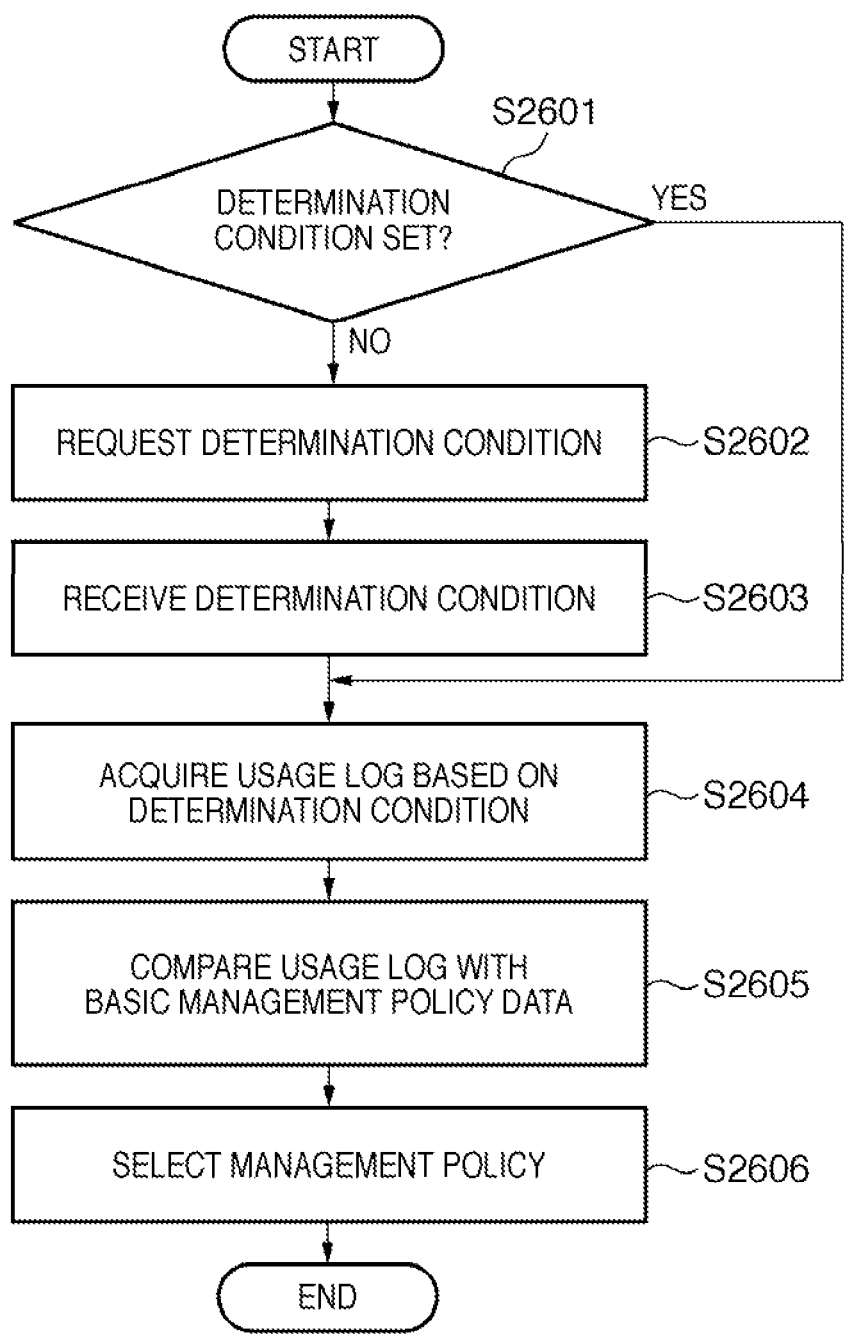
FIG. 26 is a flowchart showing the sequence of processing for automatically selecting a management policy from basic management policy data based on a log file.

The processing which is executed in step S810 to select a management policy (management policy selection processing) will be described below with reference to FIGS. 26, 27, and 28. FIG. 26 is a flowchart showing the sequence of processing executed when the management server 20 automatically selects a management policy from the basic management policy data stored in the terminal usage database 20-10*a* based on a log file in the terminal log database 20-10*b*.

FIG. 27 is a view showing an example of the basic management policy data prepared in advance in the management server. From this basic management policy data, a management policy to be set in the client terminal 50 is selected. FIG. 28 is a view showing a usage log of the client terminal 50 acquired based on determination conditions to be described later from the terminal log database 20-10*b*.

The management server 20 checks in step S2601 in FIG. 26 if the terminal usage database 20-10*a* stores a setting of determination conditions of the corresponding client terminal 50. If no setting is stored (NO in step S2601), the process advances to step S2602; otherwise (YES in step S2601), the process jumps to step S2604.

In step S2602, the management server 20 sends a determination condition request to the administrator terminal 30 using the request transmission/reception unit 20-10*e*. The management server 20 receives the determination conditions from the administrator terminal 30 using the request transmission/reception unit 20-10*e* (step S2603).

Note that the determination conditions include a period condition indicating a period in which the usage logs are to be selected, a selection condition indicating how to select a management policy from the basic management policy data based on the usage logs in the determined period, and so forth.

For example, the period condition can include conditions such as "previous day", "last week", "one week of certain month of last year", "past half year until today", and "every Wednesday", and can be freely determined in correspondence with a management environment. The selection condition is a condition indicating how to select a management policy from the basic management policy data based on the usage logs. For example, "follow all time periods of use", "two hours before and after total overlapping time period", "12 hours from earliest use start time", and the like can be freely set in correspondence with the management environment. As described above, the terminal usage database 20-10*a* can also store the determination conditions used upon selection of a management policy.

For the sake of simplicity, the following description will be given under the assumption that the period condition is "last week", and the selection condition is "follow all time periods of use" in the determination conditions received in step S2603. After the determination conditions are received from the administrator terminal 30 in step S2603, the process advances to step S2604.

In step S2604, the management server 20 acquires usage logs for a week exemplified in FIG. 28 based on the period condition from the terminal log database 20-10*b*.

The management server 20 compares the acquired usage logs with the basic management policy data (FIG. 27) using the log-management policy acquisition unit 20-10*g* (step S2605).

Then, the management server 20 selects a management policy based on the comparison result in step S2605 (step S2606). For example, the management server 20 can select a basic management policy including all actually used time zones described in the usage logs. More specifically, the management server 20 can select a basic management policy including a time zone which starts from the earliest one of use start times in the usage logs and ends at the latest one of use end times in the usage logs. In the example of FIGS. 27 and 28, management policy #5, which follows a time period of use from 8:30 as the earliest use start time to 19:00 as the latest end time in the usage logs, can be selected.

Note that the management policy selection method is not limited to the above method. For example, a basic management policy including the following time zone may be selected:

a time zone which starts from an average time of use start times in the usage logs, and ends at an average time of use end times in the usage logs; or a time zone which starts from the second earliest one of use start times in the usage logs, and ends at the second latest one of use end times in the usage logs.

(Setting of Remaining Usage-Permitted Time Period)

FIG. 12 is a sequence chart showing the processes until a remaining usage-permitted time period based on the built-in clock of the management server 20 or administrator terminal 30 is set in the client terminal 50.

The client terminal 50 transmits a request that requests the remaining time period of use based on the built-in clock of the management server 20 to the management server 20 using the request transmission/reception unit 50-10*d* (step S1201). At this time, information that allows the aforementioned management server 20 to uniquely specify the client terminal 50 (i.e., identification information of the client terminal 50) is sent together with the request that requests the remaining time period of use based on the built-in clock of the management server 20.

Upon reception of the request from the client terminal 50, the management server 20 searches the terminal usage database 20-10*a* for the management policy of the client terminal 50 (step S1202). In this step, the management policy is searched for using the request and the information which is sent together with the request and can uniquely specify the client terminal 50.

The management server 20 loads the management policy corresponding to the client terminal 50 as a request transmission source from the terminal usage database 20-10*a* (step S1203). At this time, when use of a time based on the built-in clock of the administrator terminal 30 in place of that of the management server 20 is set in the management policy, the management server 20 acquires a time of the built-in clock from the administrator terminal 30 (step S1204).

The management server 20 calculates a remaining usage-permitted time period using the calculation unit 20-10*i* from the built-in clock information of the administrator terminal 30 acquired in step S1204 or that of the management server 20 (step S1205). More specifically, the management server 20 calculates a remaining time period until the usage-permitted time period is over by subtracting a time acquired in step S1203 or S1204 from an end time of the usage-permitted time period acquired in step S1203.

The management server 20 transmits information of the remaining usage-permitted time period based on the built-in clock of the administrator terminal 30 or management server 20 to the client terminal 50 (step S1206).

The client terminal 50 stores the information of the remaining usage-permitted time period based on the built-in clock of the administrator terminal 30 or management server 20, which is transmitted from the management server 20, in the usage database 50-10a, and sets the remaining usage-permitted time period (step S1207).

As described above, details of acquisition of the remaining usage-permitted time period based on the built-in clock of the administrator terminal 30 or management server 20 by the client terminal 50 via the network 40 have been explained with reference to FIG. 12. However, management using a built-in clock of the client terminal may be specified in the management policy of the client terminal 50. In this case, the operations in steps S1201 to S1206 are omitted, and the remaining usage-permitted time period based on the built-in clock of the client terminal 50 is applied. In this case, even when the client terminal 50 is set in an offline state, it can appropriately operate in correspondence with the usage-permitted time period described in the management policy.

FIG. 14 is a view showing an example of a management policy input screen when the client terminal is in an offline state. Assume that the input contents follow the aforementioned batch setting.

(Remaining Usage-Permitted Time Period Setting Processing)

Figure 13:
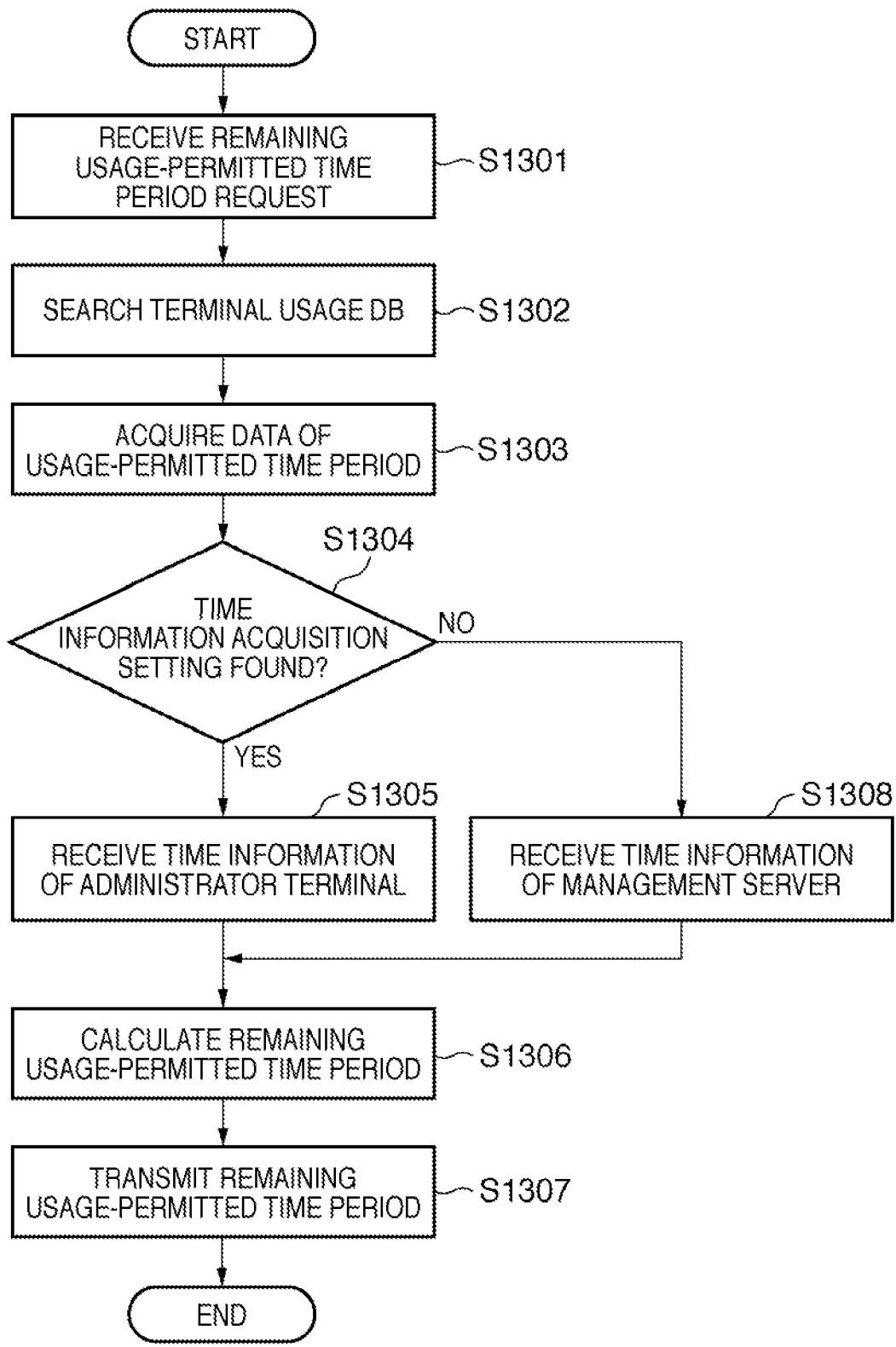
FIG. 13 is a flowchart showing the operation of the management server to set a remaining usage-permitted time period in a client terminal.

Processing to be executed by the management server 20 to set the remaining usage-permitted time period (remaining usage-permitted time period setting processing) will be described below with reference to FIG. 13. FIG. 13 is a flowchart showing the operation of the management server 20 until processing for transmitting the remaining usage-permitted time period based on the built-in clock of the management server 20 or administrator terminal 30 from the management server 20 to the client terminal 50.

In step S1301, the management server 20 receives a remaining usage-permitted time period request from the client terminal 50. The management server 20 then searches the terminal usage database 20-10a for the management policy of the corresponding client terminal 50 (step S1302). The management server 20 acquires data of the usage-permitted time period from the found management policy (step S1303).

The management server 20 checks whether or not a time information acquisition setting is set to indicate the built-in clock of the administrator terminal 30 (step S1304). If the time information acquisition setting is set to indicate the built-in clock of the administrator terminal 30 (YES in step S1304), the management server 20 receives time information as the built-in clock of the administrator terminal 30 (step S1305). If the time information acquisition setting is not particularly set (NO in step S1304), the management server 20 receives time information as its built-in clock (step S1308).

In step S1306, the management server 20 calculates the remaining usage-permitted time period from the received time information. In step S1307, the management server 20 transmits information of the remaining usage-permitted time period to the client terminal 50.

(Operation of Client Terminal)

Figure 15:
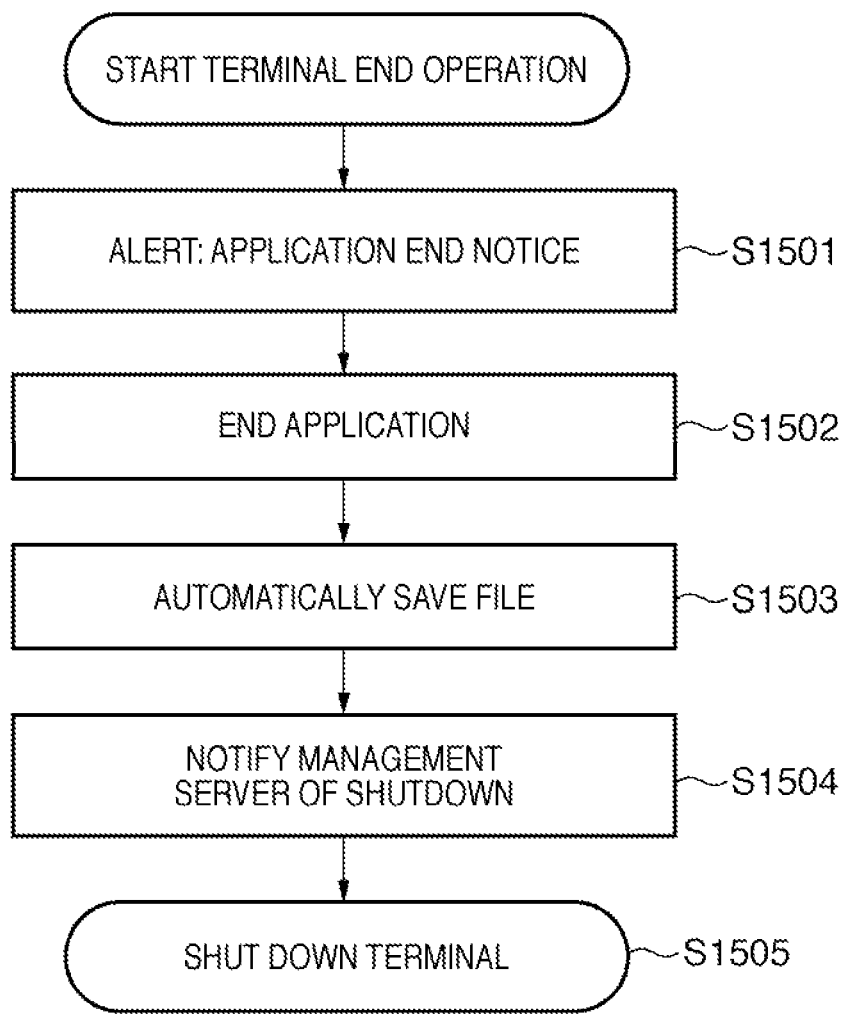
FIG. 15 is a flowchart showing the operation sequence of a client terminal until a client terminal is shut down since a usage-permitted time period is over.

Processing to be executed by the client terminal 50 will be described below with reference to FIG. 15. FIG. 15 shows the operation sequence of the client terminal 50 until the client terminal 50 is shut down since the usage-permitted time period is over. Respective steps in FIG. 15 are executed under the control of a CPU 50-1 (not shown) of the client terminal 50, and the same applies to other processes by the management server 20 to be described below with reference to the flowcharts unless otherwise specified.

In response to that the remaining usage-permitted time period of the client terminal 50 becomes a remaining time period set in the management policy, the client terminal 50 displays an alert message on its display 50-8 (not shown) (step S1501). For example, when a display time of the alert message is set to be 10 minutes before the end time of the usage-permitted time period in the management policy, the alert message is displayed when 10 minutes remain as the usage-permitted time period. FIG. 16 is a view showing an example of the alert message displayed on the display 50-8 (not shown).

If the end time of the usage-permitted time period set in the aforementioned management policy is reached, the client terminal 50 displays an alert on the display 50-8 again (not shown). FIG. 17 is a view showing an example of the alert message displayed when the end time of the usage-permitted time period is reached. Then, the client terminal 50 starts an end operation of an active application using the terminal time period of use control unit 50-10e (step S1502). At this time, the client terminal 50 executes control for automatically saving a file and setting in use (step S1503).

The client terminal 50 then notifies the management server 20 that it will be shut down soon (step S1504). In response to this notification, the terminal log database 20-10b of the management server 20 records the end of the application in step S1502, saving of the file in step S1503, and shutting down in step S1504 above.

The client terminal 50 ends the shutdown operation (step S1505).

As described above, in this embodiment, the management server 20 stores the management policies including the usage-permitted time periods of the plurality of client terminals 50. The management server 20 reads out the management policy including the usage-permitted time period of the client terminal 50 to be managed from a storage device, outputs the readout management policy to the client terminal 50, and applies the usage-permitted time period to that client terminal 50. Note that the management server 20 stores a basic management policy table including a plurality of usage-permitted time periods as management policies, selects one of usage-permitted time periods from the basic management policy table, and applies the selected usage-permitted time period to the client terminal 50. Therefore, the management server 20 can apply an optimal management schedule to each client terminal 50.

The management server 20 receives usage logs from the client terminal 50, and records the received usage logs as a log file. The management server 20 then selects one of usage-permitted time periods based on the recorded log file. Therefore, the management server 20 can flexibly apply an optimal management schedule to each client terminal 50 in correspondence with a usage form of that terminal.

The management policy includes a use end time at which the client terminal 50 is set in an unavailable state, and a use start time at which the client terminal 50 is set in an available state. The management server 20 outputs this management policy to the client terminal 50 to set the client terminal in an unavailable state at the use end time or in an available state at the use start time. For this reason, the management server 20 can appropriately manage the time period of use of the client terminal by transmitting the management policy.

The management server 20 generates screen data which indicates the management policy, and can be browsed using a Web browser, and outputs this screen data to an external apparatus such as the administrator terminal 30 in response to a request from that external apparatus. Therefore, the apparatus which includes the Web browser can confirm the management policy by accessing the management server 20.

The management server 20 can execute accepting processing for accepting the setting of the management policy for each group of client terminals. For this reason, the user can set the management policy for a plurality of client terminals together.

The management server 20 calculates a time period from the current time to the end time of the usage-permitted time period based on a difference between the end time and the current time, and notifies the client terminal 50 of that time period. For this reason, when a time pointed by the clock of the client terminal 50 is inaccurate, or when time synchronization is not always taken in an environment in which the client terminal 50 is managed in a zone with time differences, or a zone in which a daylight-saving time is introduced, the client terminal 50 can end its operation at the end time based on the received time period. Note that when a time period from the current time to the end time assumes a predetermined value, the management server 20 may notify the client terminal 50 of that time period.

The client terminals 50 may be classified into groups, and the management server 20 may execute display control to display log files of the client terminals 50 that belong to an identical group in association with the management policy. In this case, the user can recognize correspondence between the log files and management policy for each group at a glance.

In this embodiment, usage logs of terminals are recorded in jobs and school works in workplaces of public offices, companies, schools, stores, community facilities, and the like, and the recorded usage logs are analyzed. For this reason, information leakage due to an operation of a terminal which is left to stand by a third party can be effectively prevented.

When the terminals and network suffer failures by intention or fault of a terminal user, or they are subject to attack of viruses or worms, the usage logs and management policies can be analyzed. As a result, evidence detection, cause unfolding, and the like of occurrence of problems can be effectively done.

The aforementioned effects can be achieved by only a terminal represented by a personal computer and its programs without using any special power supply management apparatus or the like. Therefore, extra cost can be suppressed.

In FIG. 15, the case has been explained wherein the alert message is displayed in response to that the remaining usage-permitted time period of the client terminal 50 becomes a remaining time period set in the management policy (step S1501). However, the present invention is not limited to this. For example, when the management policy includes a usage-permitted time period that permits to use the client terminal 50, steps S1501 to S1505 may be executed in response to that the total time period of use of that client terminal 50, that is, the sum total of time periods of use or a time period of use as a total during a predetermined period reaches the usage-permitted time period prescribed in the management policy. With this arrangement, even in a system that requires managing the total time period of use of the client terminals 50 like in a computer system of a workplace adopting a flextime system, an optimal management schedule can be flexibly applied.

Note that the management policy may include an individual usage-permitted time period for each client terminal, and may be output to each client terminal. In this case, an appropriate management schedule can be applied to each client terminal.

Also, the management policy may include a usage-permitted time period in which a predetermined group of client terminals is permitted to use. In this case, by outputting this management policy to the client terminal group, when the total time period of use of the client terminals included in the group reaches the usage-permitted time period, the respective client terminals included in that group are set in an unavailable state. With this arrangement, an appropriate management schedule can be applied to each client terminal group and, for example, the energy excretion amount of the overall organization can be appropriately controlled.

Second Embodiment

A terminal management system according to the second embodiment has a function of prompting the user to select whether or not to extend the usage-permitted time period of the client terminal 50 when the end time of the usage-permitted time period is drawn on, in addition to the terminal management system according to the first embodiment.

Since most of the operations of the second embodiment are common to those of the first embodiment, only operations different from those of the first embodiment will be explained, and a repetitive description of the common operations will be avoided. Since the hardware arrangements and software configurations of the management server 20, administrator terminal 30, client terminals 50, and general terminal 60 in this embodiment are the same as those in the first embodiment, a description thereof will not be given.

Figure 18:
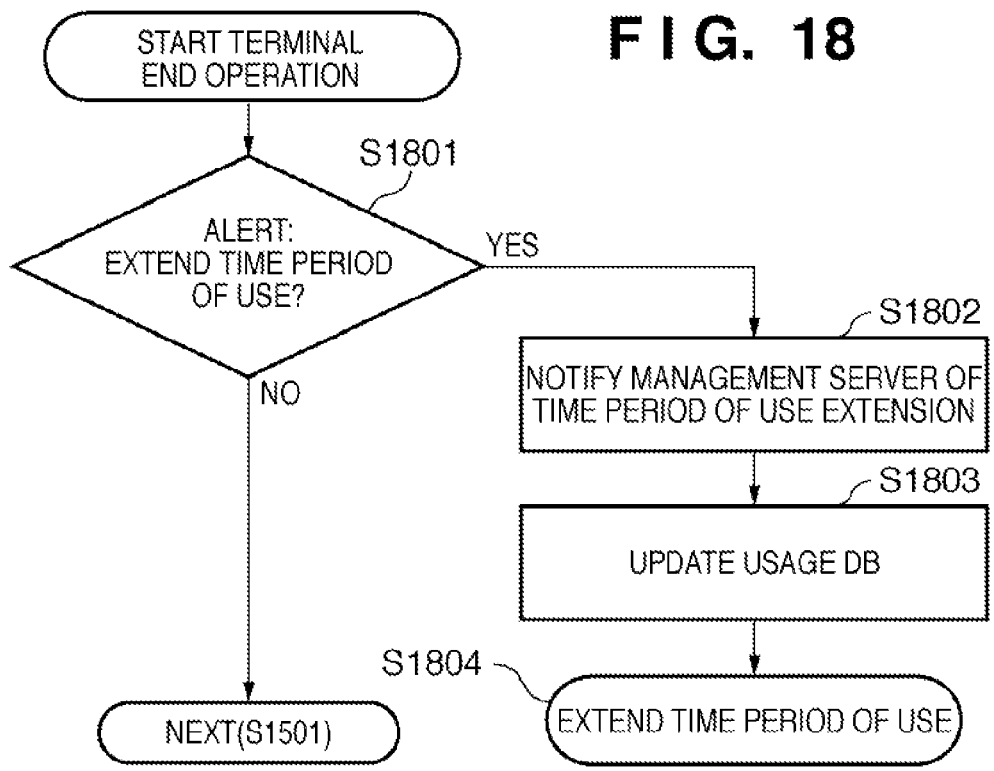
FIG. 18 is a flowchart to be executed by a client terminal in association with extension of a permitted time period and updating of a usage log.

FIG. 18 is a flowchart to be executed by the client terminal 50 in association with extension of a permitted time period and updating of a usage log. The sequence of FIG. 18 is started when the remaining usage-permitted time period of the client terminal 50 becomes an extension setting time period set in the management policy in the usage database 50-10a. For example, when the setting indicates 10 minutes before the end time, this sequence is started when the remaining usage-permitted time period becomes 10 minutes.

Figure 19:
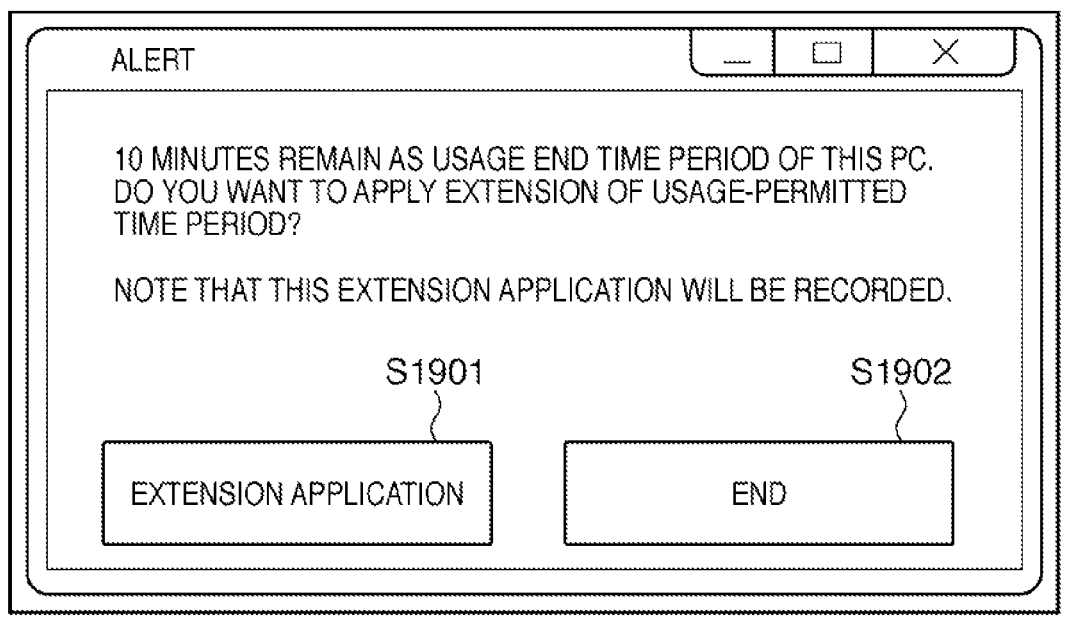
FIG. 19 is a view showing an example of an inquiry about extension of a time period of use.

When the extension setting time period is reached, the client terminal 50 displays an inquiry about extension of a time period of use on its display 50-8 (not shown). FIG. 19 is a view showing an example of such inquiry about time period of use extension.

The client terminal 50 checks whether or not to select extension of a time period of use as a user's instruction to the client terminal 50 in response to that inquiry (step S1801). In the example of FIG. 19, when the user selects an item "extension application" 1901, it is determined that extension of a time period of use is selected; when the user selects an item "end" 1902, it is determined that extension of a time period of use is not selected.

If the user of the client terminal 50 selects not to extend a time period of use (NO in step S1801), the client terminal 50 executes the same processes in step S1501 and subsequent steps in FIG. 15 in the first embodiment. At this time, the alert (step S1501) on the client terminal 50 may be displayed immediately after selection of the time period of use extension is made. Alternatively, the alert display timing may be separately set in the management policy, and the alert may be displayed at that timing.

On the other hand, if the user of the client terminal 50 selects to extend the time period of use in step S1801 (YES in step S1801), the client terminal 50 notifies the management server 20 of time period of use extension (step S1802). Then, the client terminal 50 updates the usage database 50-10a (step S1803). In this case, the usage log associated with the client terminal 50 in the terminal log database 20-10b in the management server 20 is also updated.

After the aforementioned operation and processing are executed between the client terminal 50 and management server 20, the client terminal 50 can be continuously used even after the usage-permitted time period in the management policy associated with the client terminal 50 is over (step S1804).

As described above, according to this embodiment, the management server 20 extends the usage-permitted time period of the client terminal 50 according to the state of the client terminal 50. For this reason, according to this embodiment, an optimal management schedule can be flexibly applied in correspondence with use application of each client terminal 50 in addition to the effects of the first embodiment. As the example of such arrangement, this embodiment has explained the case in which upon reception of an extension request of the usage-permitted time period from the client terminal, the usage-permitted time period of the client terminal is extended. For this reason, according to the arrangement of this embodiment, an appropriate management schedule can be applied at the user's desire. As will be described later, when the client terminal executes uninterruptible processing, the usage-permitted time period of that client terminal may be automatically extended.

For example, the time period of use of a terminal associated with a service after the appropriate usage-permitted time period, that is, a work such as an overtime or extended work can also be extended. Even when the usage-permitted time period is extended, since the usage log is recorded, if the terminal is used for the purpose other than an appropriate service, inappropriate usage contents are sorted out, and the terminal user can then be specified.

In this embodiment, when the management server 20 receives an extension request of the usage-permitted time period from the client terminal 50, it updates the management policy to extend the usage-permitted time period. For this reason, according to this embodiment, by updating the management policy, an appropriate management schedule can be flexibly applied in correspondence with use application of each client terminal 50, in addition to the effects of the first embodiment.

For example, assume that the usage-permitted time period of a specific client terminal is extended by three hours due to, for example, an overload, and that terminal is shut down. In this case, a time three hours later than the usage-permitted time period in the initial management policy is saved as a log in the terminal log database 20-10b. Hence, the administrator terminal 30 can directly set a usage-permitted time period of the terminal as that extended by three hours based on the updated log file in the terminal log database 20-10b. That is, the management policy that fits reality of the service contents can be set based on the log including the extended usage-permitted time period.

In this embodiment, the usage log of the client terminal 50 is received from that client terminal 50, and is recorded as a log file. When the usage-permitted time period of the client terminal 50 is extended, that effect is recorded in the log file. Therefore, by analyzing the log file, the cause of extension of the usage-permitted time period can be evaluated.

Third Embodiment

The first embodiment has explained the arrangement in which the administrator terminal 30 rewrites the databases in the management server 20. By contrast, the third embodiment will explain an arrangement in which the general terminal 60 gets a usage permission from the management server 20, establishes connection to the management server 20 via a Web browser, and can change or update the management policy of the designated client terminal 50.

Software installed in the general terminal 60 is a Web browser alone unlike the management server 20, administrator terminal 30, and client terminals 50 in the first embodiment. Since the hardware arrangements and software configurations of the management server 20, administrator terminal 30, and client terminals 50, and hardware arrangement of the general terminal 60 of this embodiment are the same as those in the first embodiment, a description thereof will not be repeated.

Figure 20:
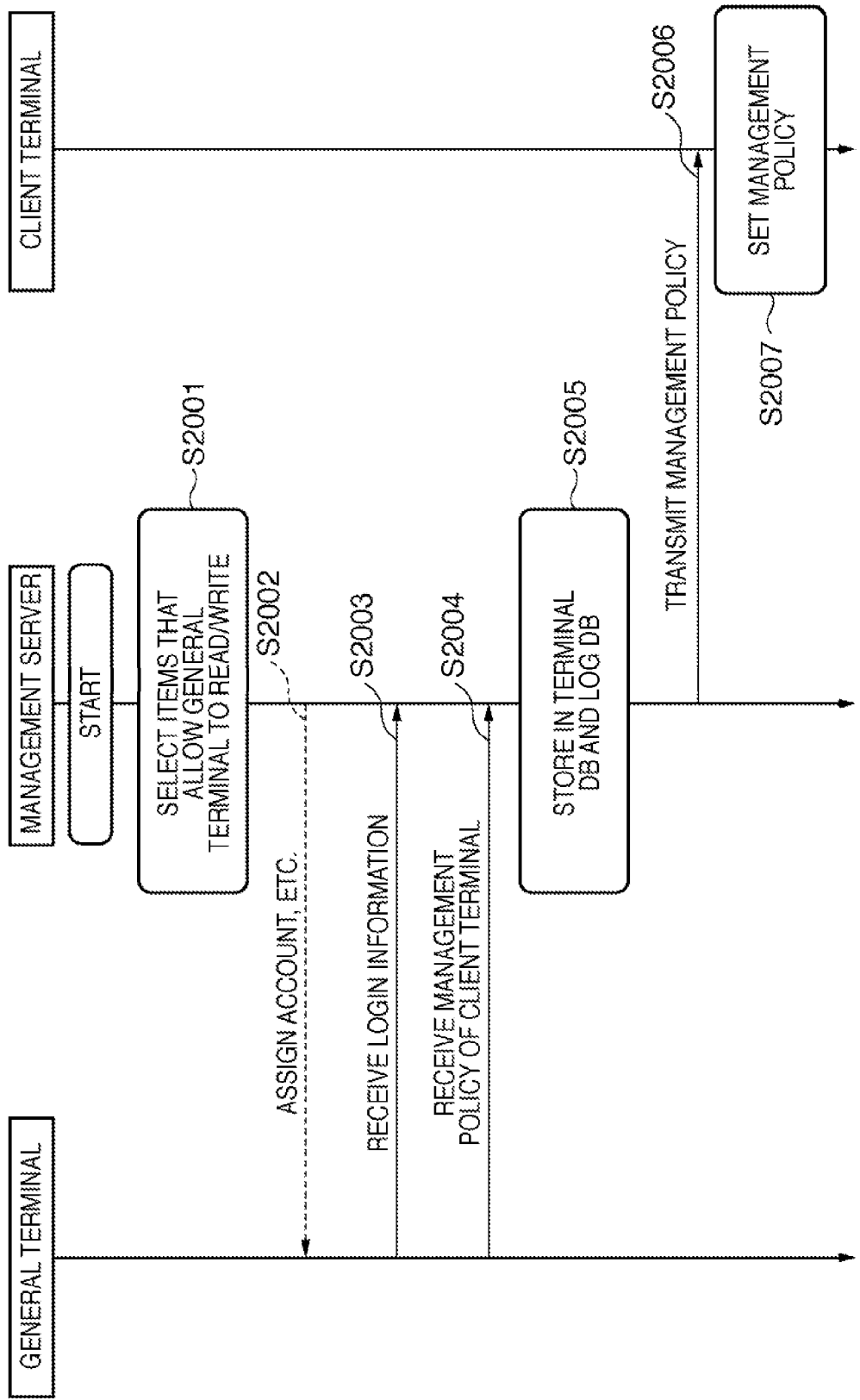
FIG. 20 is a sequence chart showing the sequence of the operation executed when a general terminal rewrites a management policy for a client terminal.

Details will be described below with reference to FIG. 20. FIG. 20 is a sequence chart showing the sequence of the operation executed when a specific general terminal rewrites a management policy for the designated client terminal. The management server 20 selects items such as authority to read and write the management policy of the specific client terminal 50 and to browse a log, that the general terminal 60 can manipulate (step S2001). This selection can be made by storing, in advance, information including a list of manipulations that the general terminal 60 can select in a storage device such as the HDD 20-10, and reading out and referring to this information from the storage device. Alternatively, an instruction about manipulations that the general terminal 60 can select is accepted from the administrator on the administrator terminal 30, and is transferred from the administrator terminal 30 to the management server 20, thus selecting items that can be manipulated.

Next, the management server 20 gives an account to the general terminal 60 to which a usage permission is granted (step S2002). More specifically, the management server 20 gives authority that allows the general terminal 60 to access the management server 20, and the terminal usage database 20-10a and terminal log database 20-10b in the management server 20 via the Web browser and the network 40. Note that the account is assigned only for the first processing, and the operation in the second or subsequent processing can be omitted.

FIG. 22 is a view showing an interface that allows the general terminal 60 to access the management server 20 via the Web browser. FIG. 22 exemplifies an interface required for the general terminal 60 to transmit an ID 2201 and password 2202 as an account required to access the management server 20. By transmitting the ID and password, the aforementioned authority to read and write the management policy and to browse a log is acquired.

The general terminal 60 can log in to the management server 20 by browsing this screen on the Web browser and inputting proper login information without including any administrator program 30-10a (step S2003).

The general terminal 60 transmits data of a management policy associated with the client terminal (step S2004). In this case, the general terminal 60 calls up data of the designated client terminal 50, management of which is authorized to the terminal 60, from the terminal usage database 20-10a, and inputs the management policy of the designated client terminal 50 to that data.

FIG. 23 is a view showing an example of a screen used to input the management policy of the client terminal 50. Upon reception of the proper login information from the general terminal 60, the management server 20 transmits data of the screen shown in FIG. 23 to the general terminal 60, and accepts input of the management policy of the client terminal 50 from the general terminal 60.

Upon reception of the management policy which is transmitted from the general terminal 60 and is associated with the client terminal 50, the management server 20 stores that management policy in the terminal usage database 20-10a (step S2005). At this time, the management server 20 may record a log indicating that the general terminal 60 inputs the management policy in the terminal log database 20-10b. This is to allow browsing this log later.

FIG. 24 is a view showing an example of a screen that allows the administrator to browse the log associated with input of the management policy by the general terminal 60. Referring to FIG. 24, reference numeral 2401 denotes a calendar which is used to select dates of the logs to be displayed, and accepts dates of administrator's choice. In addition, after the start time and end time to be browsed of the logs are selected, when the administrator selects a "display log" button 2402, the management server 20 displays a screen that displays the logs of the selected dates and times.

Figure 25:
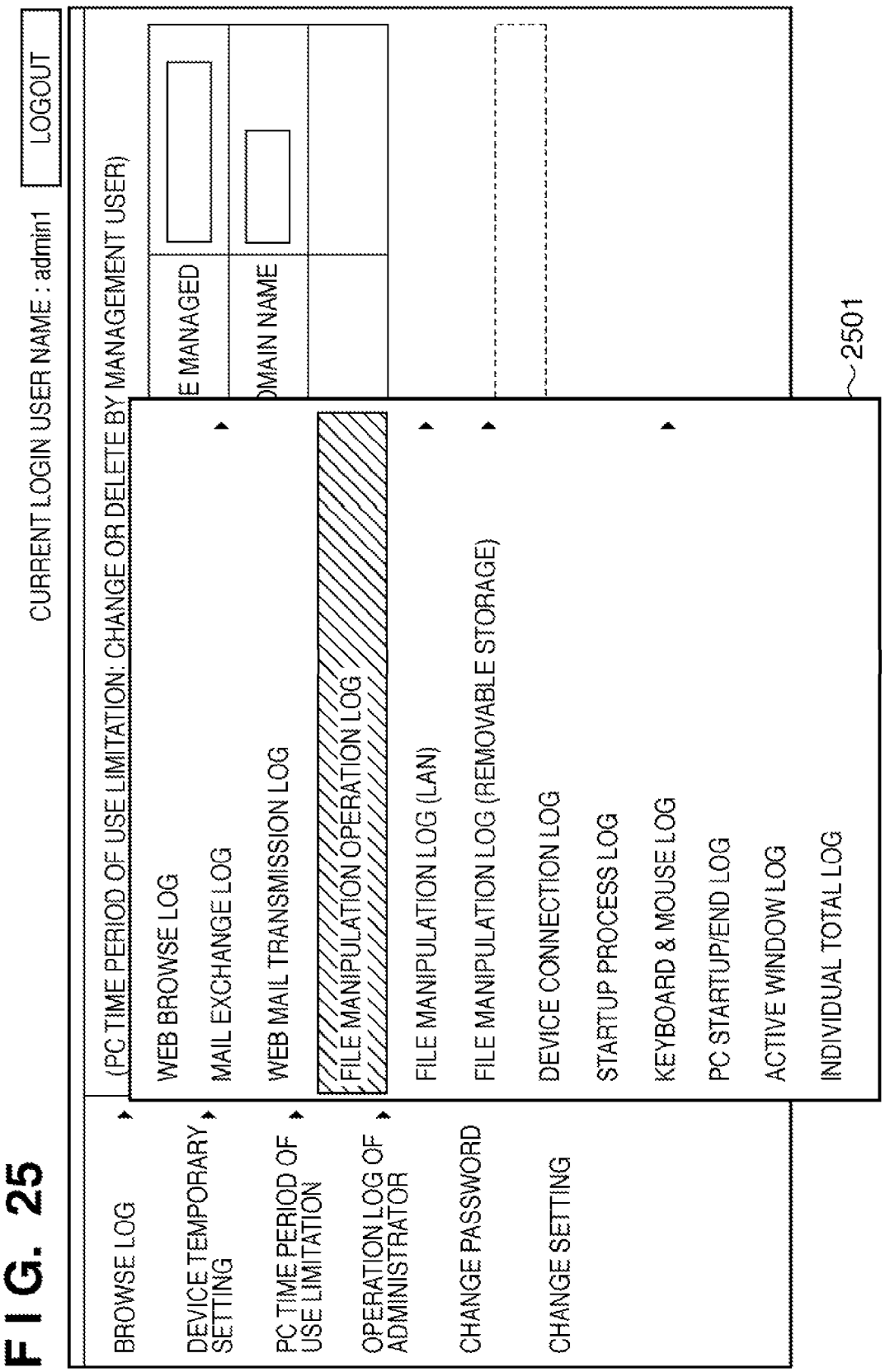
FIG. 25 is a view showing an example of a screen that allows a general terminal to browse a usage log of a client terminal.

Although not shown in FIG. 20, the usage logs of the client terminal 50 can be browsed depending on the authority. FIG. 25 is a view showing an example of a screen that allows the general terminal 60 to browse the usage logs of the client terminal 50. Referring to FIG. 25, reference numeral 2501 denotes a list display of the usage modes of the client terminal 50. When any of usage modes included in this list is selected by the general terminal 60, the management server 20 transmits the selected contents to the general terminal 60, and executes display control of the transmitted contents.

After that, as in steps S713 and S714 in the first embodiment, the management server 20 transmits the management policy to the client terminal (step S2006). As a result, the management policy is applied to the client terminal (step S2007).

Since the same operations as those in FIGS. 12, 15, and 18 are executed as in the first and second embodiments after the aforementioned operation, a repetitive description thereof will be avoided. Note that a series of operations for rewriting the management policy using the Web browser, as described above, may be done using the management server 20 and administrator terminal 30 which include Web browsers, in addition to the general terminal 60.

Figure 21:
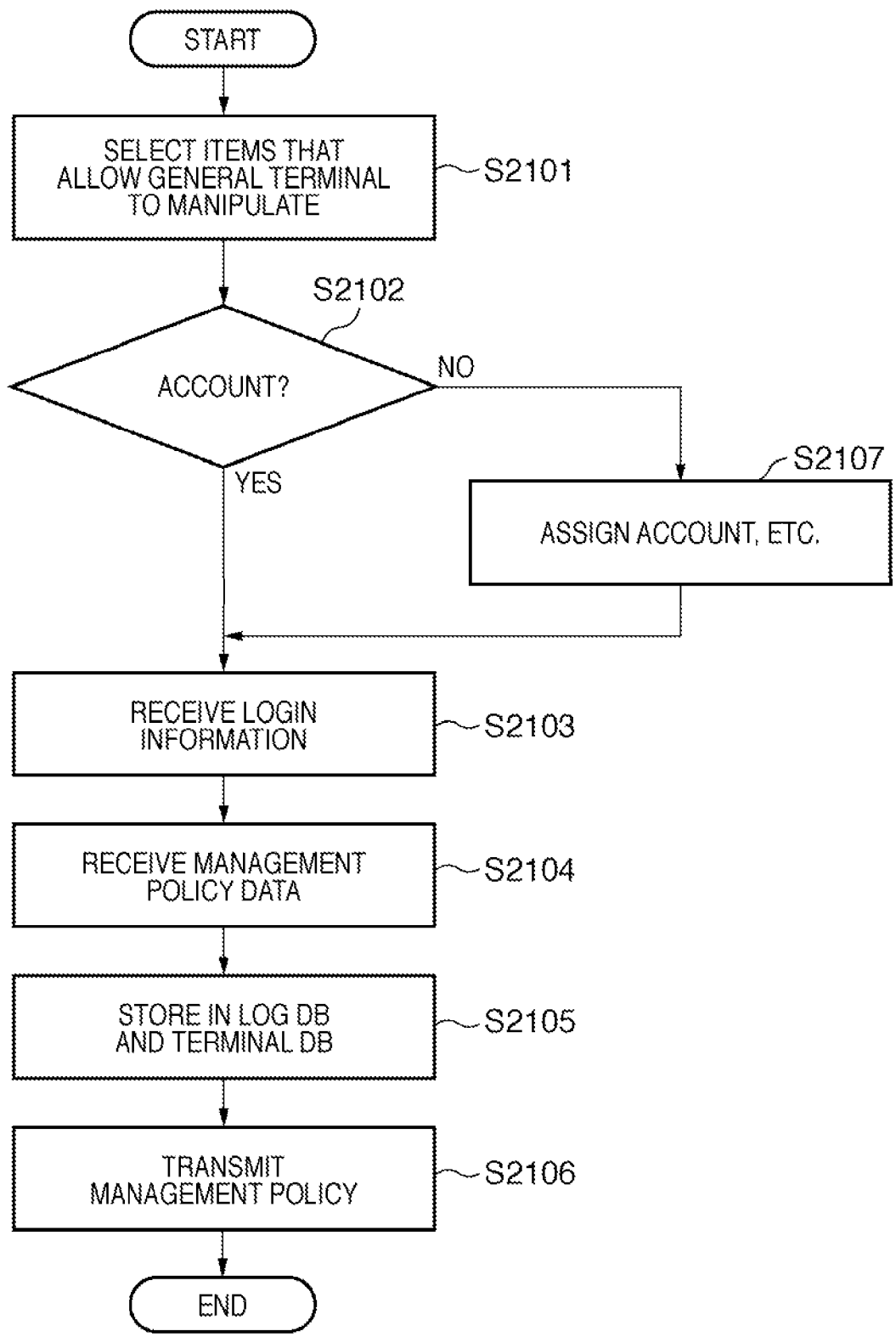
FIG. 21 is a flowchart showing the sequence of the operation of the management server when a general terminal can change and update the management policy of a client terminal.

FIG. 21 is a flowchart showing the sequence of the operation of the management server 20 in processing until the general terminal 60 which is granted a usage permission of the management server 20 is allowed to change or update the management policy of the designated client terminal 50.

In step S2101, the management server 20 selects items such as read/write access to the management policy of the designated client terminal 50, a permission of manipulations of which is granted to the general terminal 60, that is, items that the general terminal 60 can manipulate. As described above, this selection can be attained based on the contents set in advance in the management server 20 or based on an instruction from the administrator.

The management server 20 checks in step S2102 if an account has already been given to the general terminal 60. The management server 20 stores information used to identify the general terminal 60 to which the account is given, in a storage device such as the HDD 20-10, and can implement the checking process in step S2102 with reference to that information.

If an account has already been given to the general terminal 60 (YES in step S2102), the management server 20 receives login information from the general terminal 60 (step S2103). On the other hand, if an account has not been given to the general terminal 60 yet (NO in step S2102), the management terminal 20 gives an account and the like (step S2107), and receives login information from the general terminal 60 (step S2103).

The management terminal 20 then receives management policy data of the designated client terminal 50 from the general terminal 60 (step S2104), stores the management policy in the terminal usage database 20-10a, and stores a log indicating that the general terminal 60 inputs the management policy in the terminal log database 20-10b (step S2105). The management server 20 transmits the stored management policy to the designated client terminal 50 (step S2106), and sets the management policy.

As described above, this embodiment allows not only the administrator terminal 30 but also the general terminal 60 to set and change the management policy. Therefore, terminal management can cope with an irregular schedule in addition to the effects of the first and second embodiments. For example, when a rush job is received and the time period of use of the terminal has to be extended, when the workplace is rearranged, or when the administrator is absent in a large-scale workplace, a person at the administrative position can change the usage-permitted time period on a temporary basis, thus enhancing usability.

Since a specific program need not be installed in the general terminal, and the Web browser with high versatility can be used, a flexible measure can be taken using a generally prevailed PC.

Fourth Embodiment

The first embodiment has explained the processing for selecting processing for selecting the management policy based on the usage log with reference to FIGS. 26 to 28. However, the present invention is not limited to the aforementioned example. This embodiment will explain, as another example of selection of the management policy based on the usage log, an arrangement in which when it is determined based on the usage log that the client terminal 50 is not used for a predetermined period, a basic management policy for shortening the usage-permitted time period of that client terminal 50 is selected and applied. Since the apparatus arrangement and system arrangement are the same as those in the first embodiment, a repetitive description thereof will be avoided, and only differences from the arrangement of the first embodiment will be explained.

In this embodiment, when it is determined based on the usage log of the client terminal 50 that the client terminal 50 is not used for a predetermined period of time, the management server 20 controls to re-set to shorten the usage-permitted time period in the management policy of the client terminal 50. Criteria used to determine if the client terminal 50 is "not used" include:

the count value indicated by the "operation contents of the pointing device (the moving distance of a mouse, and the keying count of a keyboard)" included in the usage log is "0" over a predetermined period of time;

no file manipulations (creation, updating, deletion, and so forth) are recorded in the usage log over a predetermined period of time; and the frontmost window (a so-called active window) upon using an application or software is not updated in the usage log over a predetermined period of time.

The criteria used to determine if the client terminal 50 is not used are not limited to those exemplified above.

(Operation of Management Server)

Figure 31:
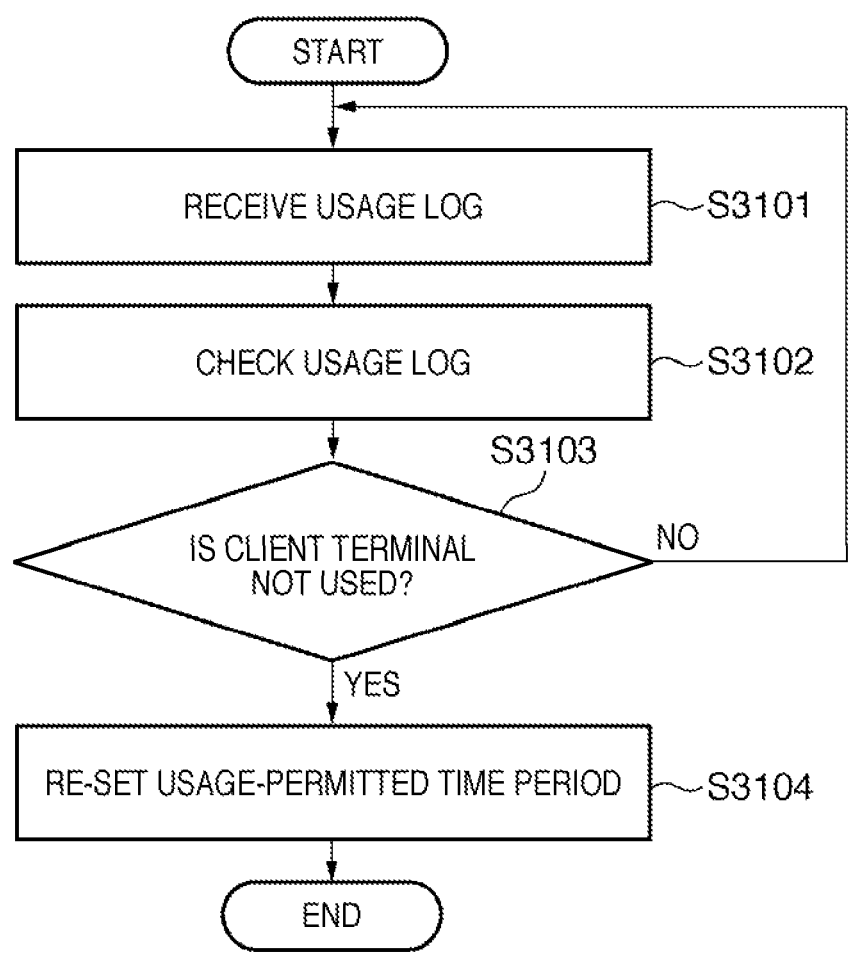
FIG. 31 is a flowchart showing the sequence of processing of the management server for shortening a usage-permitted time period when a client terminal is not used.

The operation of the management server 20 of this embodiment will be described below with reference to FIG. 31. FIG. 31 is a flowchart showing the sequence of processing of the management server 20 which shortens the usage-permitted time period when the client terminal 50 is not used. Assume that the decision criterion used to determine if the client terminal 50 is "not used" (to be referred to as a disuse decision hereinafter) is "the usage log of the pointing device is zero over one hour", for the sake of simplicity.

In step S3101, the management server 20 receives the usage log of the client terminal 50 from that client terminal 50 at predetermined timings (for example, every five minutes), as described in the first embodiment. This usage log includes information associated with the operation contents of the pointing device, file manipulation operations, an active application, an active window, and the like. The management server 20 stores the received usage log as log data.

In step S3102, the management server 20 refers to (checks) the usage log received in step S3101. The management server 20 has a function of checking a specific usage log designated in advance by the management policy. For example, the management server 20 checks the usage log of the pointing device. When the management policy of the client terminal 50 includes a "specific program", the management server 20 checks the usage log of the operation of that "specific program". Note that the specific program includes a virus check program and hard disk management program, which do not require any user's operation and require a long period of time for their processing. In this embodiment, when uninterruptible processing such as that of the specific program is in execution, the usage-permitted time period is not shortened. Another example of the uninterruptible processing will be described later.

The management server 20 checks in step S3103 based on the usage log checked in step S3102 if the client terminal 20 is not used. For example, in an arrangement in which it is determined that the client terminal 50 is not used when the "usage log of the pointing device is zero over one hour", if all of the 12 consecutive usage logs of the pointing device received at 5-minute intervals indicate "0", it is determined that the client terminal 50 is not used. If it is determined that the client terminal 50 is not used (YES in step S3103), the process advances to step S3104; otherwise (NO in step S3103), the process returns to step S3101 to continue the processing. When the operation of the aforementioned "specific program" can be detected from the usage log, a disuse decision in that time zone is invalidated.

In step S3104, the management server then re-sets the usage-permitted time period in the management policy in the client terminal. In this case, the end time of the usage-permitted time period is set to be a time immediately after the usage-permitted time period is re-set (e.g., after five minutes). The management server instructs the client terminal to display an alert screen. For example, the management server instructs the client terminal to display a message "The terminal will be shut down after five minutes because of disuse over a long period of time. Press a cancel button to continue use." Then, the processing of the management server 20 ends. Note that the usage-permitted time period may be re-set by selecting management policy data having an end time that is reached earliest from the current time from a plurality of management policy data prepared in advance in the server.

Upon reception of the changed usage-permitted time period, the client terminal 50 is shut down at that timing. Note that this shortening processing of the usage-permitted time period is recorded in the usage log in the management server terminal 20.

As described above, according to this embodiment, the management server 20 analyzes the recorded log file and calculates a time period of disuse of the client terminal 50. When the time period of disuse of the client terminal 50 exceeds a predetermined time period, the management server 20 selects and applies a usage-permitted time period that shortens the time period of use permitted to that client terminal. For this reason, according to the arrangement of this embodiment, the usage-permitted time period can be dynamically controlled according to the use state of the client terminal. By automatically shutting down a user-absent PC, its monitor can be prevented from being peeped, and information leakage due to social engineering (e.g., peeping at a password) can be effectively prevented.

Note that the log file that records the usage logs includes user's operation records with respect to the client terminal 50 (operations of the pointing device, etc.), and the management server 20 calculates a time period including no user's operation as a time period of disuse. For this reason, whether or not the client terminal 50 is not used can be appropriately determined.

In the aforementioned processing example, when the "specific program" is running, it is determined that the client terminal 50 executes uninterruptible processing, and the usage-permitted time period is not shortened even when the time period of disuse exceeds the predetermined time period. However, the case that does not allow interruption is not limited to the above case in which execution of the specific program is in progress. For example, the management server 20 may determine based on the usage log that the client terminal 50 is making an uninterruptible job, and may stop application of a new management policy to the client terminal in the following cases.

The specific program is running.

Execution of an update file or the like is in progress.

Printing, downloading, or file movement is in progress. (For example, the former active window is not finally restored since the active window of a print, download, or file movement dialog.)

As described above, when the client terminal 50 executes uninterruptible processing, the usage-permitted time period is inhibited from being shortened, thus effectively attaining the operation control of a disuse terminal without disturbing continuation of processing that requires a long period of time.

Even when the end time of the usage-permitted time period is reached, if logs including a "direct input response by the user for a predetermined period of time" or in a state in which "an uninterruptible job is in progress" are consecutively detected, the usage-permitted time period in the management policy may be automatically extended. As a result, the user can continue a job without extending the usage-permitted time period each time, while the client terminal 50 which is not used can be effectively managed.

Other Embodiments

The above embodiments have explained the arrangement that sets the client terminal 50 in an unavailable state. However, conversely, the client terminal 50 may be set in an available state at a specific time. More specifically, at least one of a startup operation, a logon operation, a return operation from a sleep state, that from a lock state, that from a standby state, and that from a suspend state may be executed.

In this case, when the user of the client terminal 50 attempts to transit the client terminal from an unavailable state to an available state by, for example, directly turning on the power supply of the client terminal after the usage-permitted time period, the client terminal 50 is forced to be unavailable. For example, the management policy is checked upon starting up an OS, and the power supply of the client terminal is turned off or the client terminal is set in an unavailable state immediately after the startup.

In the description of the above embodiments, there is one client terminal 50 to be managed to help easy understanding.

However, a plurality of client terminals 50 may be used. More specifically, for example, one or more or a plurality of client terminals 50 may be handled as a group in the terminal usage database 20-10a in the management server.

For example, when this terminal management system belongs to a group "material laboratory on second floor" or "software development division on third floor", an identical management policy may be applied to client terminals 50 that belong to the group. In this case, operations associated with use of the client terminals 50 such as power ON/OFF can be made for each group.

With the above arrangement, the flexibility and usability of the terminal management system can be further improved. For example, in addition to the aforementioned embodiments, the terminal management system can flexibly cope with even a case in which the usage-permitted time periods have different start times individually or depending on groups due to an early-morning shift, flextime system, or shift system.

Since the terminals can be managed for respective groups, for example, collective management can be made especially in a large-scale workplace. For example, the log files of one or more client terminals 50 which belong to an identical group, and the management policies that belong to the identical group can be referred to at the same time.

Note that the management server 20 and administrator terminal 30 are independently arranged in the above embodiments. However, the administrator terminal 30 may be integrated in the management server 20. In this case, the administrator can refer to a display which outputs the contents of the management server 20. All interactions such as exchange of information, which are made between the management server 20 and administrator terminal 30, are implemented by internal processing operations of the integrated management server 20.

As can be seen from the above description, characteristic features of this embodiment lie in the processing and functions of the management server 20, administrator terminal 30, and client terminal 50. As described above, since they are implemented by programs and applications which run on these terminals, the programs are obviously included in the technical scope of the present invention. Computer programs which run on the respective terminals are normally stored in external devices that can be connected to the terminals from recording media represented by an HDD, FD, CD, DVD, and storage device. These computer programs are ready to run when these computer-readable recording media are set in the terminals, and the computer programs are copied to or installed in their systems. Therefore, it is obvious that these recording media are included in the technical scope of the present invention.

As described above, according to this arrangement, since the usage logs and management policies for respective client terminals 50 are integrally managed, an optimal management schedule can be applied to each terminal.

Upon storing scheduling of the power ON/OFF times or usage-permitted time period of each client terminal 50 as a management policy in the server via the network, the management server 20 side acquires the usage log of the client terminal as an operation log. When the usage-permitted time period of the active client terminal 50 is over, the server automatically turns off the power supply of that client terminal. As a result, the client terminal 50 can be prevented at all from being used after hours set by the administrator. Since the operation contents of the client terminal 50 are acquired by the management server 20 as logs, the management server 20 side can recognize the use state of the client terminal 50 by the minute. The usage-permitted time period of the client terminal 50 can be freely set in correspondence with a usage environment when the administrator who manages the terminal management system operates the administrator terminal 30, and an irregular business form and time schedule can be flexibly coped with. Therefore, use after the usage-permitted time period by the user, illicit use by a third party, forgetting to turn off the power supply of the terminal set in the available state, and the like can be minimized or prevented, thus avoiding unnecessary power consumption and information leakage.

The present invention is not limited to the above embodiments and various changes and modifications can be made within the spirit and scope of the present invention. Therefore, to apprise the public of the scope of the present invention, the following claims are appended.

This application claims the benefit of Japanese Patent Application No. 2007-306247, filed on Nov. 27, 2007, which is hereby incorporated by reference herein in its entirety.

The invention claimed is:

1. A management server which is connected to a plurality of client terminals via a network, comprising:
    a reception unit constructed to receive a usage log of one of the plurality of client terminals to be managed from the one client terminal;
    a recording unit constructed to record the received usage log as a log file;
    a calculation unit constructed to calculate a time period of disuse of the one client terminal to be managed by analyzing the log file recorded by the recording unit;
    a storage unit constructed to store a management policy including usage-permitted time periods of the plurality of client terminals; and
    an application unit constructed to, when the time period of disuse of the one client terminal to be managed exceeds a predetermined time period, read out from the storage unit the management policy including the usage-permitted time period used to shorten a usage-permitted time period for the one client terminal, and set the management policy including the shortened usage-permitted time period on the one client terminal,
    wherein even when the time period of disuse of the one client terminal exceeds the predetermined time period, when the one client terminal executes uninterruptible processing, the application unit does not apply the usage-permitted time period used to shorten the usage-permitted time period for the one client terminal.

2. The management server according to claim 1, wherein the log file includes a user's operation record with respect to the one client terminal, and the calculation unit calculates a time period in which no user's operation is made as the time period of disuse.

3. The management server according to claim 1, wherein the one client terminal is identified by the identification information of a user of the one client terminal.

4. A non-transitory computer-readable storage medium, storing in executable form a program for making a computer function as a management server according to claim 1.

5. A terminal management method by a management server which is connected to a plurality of client terminals via a network, comprising:
    a receiving step for receiving a usage log of one of the plurality of client terminals to be managed from the one client terminal;
    a recording step for recording the received usage log as a log file;

a calculating step for calculating a time period of disuse of the one client terminal to be managed by analyzing the log file recorded in the recording step;

a storing step for storing a management policy including usage-permitted time periods of the plurality of client terminals into a storage unit; and an applying step, when the time period of disuse of the one client terminal to be managed exceeds a predetermined time period, for reading out from the storage unit the management policy including the usage-permitted time period used to shorten a usage-permitted time period for the one client terminal, and for setting the management policy including the shortened usage-permitted time period on the one client terminal, wherein even when the time period of disuse of the one client terminal exceeds the predetermined time period, when the one client terminal executes uninterruptible processing, the usage-permitted time period used to shorten the usage-permitted time period for the one client terminal is not applied in the applying step.

6. A terminal management system including a management server and a plurality of client terminals which are connected to the management server via a network, the management server comprising:

a first reception unit constructed to receive a usage log of one of the plurality client terminals to be managed from the one client terminal;

a recording unit constructed to record the received usage log as a log file;

a calculation unit constructed to calculate a time period of disuse of the one client terminal to be managed by analyzing the log file recorded by the recording unit;

a storage unit constructed to store a management policy including usage-permitted time periods of the plurality of client terminals; and a first application unit constructed to, when the time period of disuse of the one client terminal to be managed exceeds a predetermined time period, read out from the storage unit the management policy including the usage-permitted time period used to shorten a usage-permitted time period for the one client terminal, and set the management policy including the shortened usage-permitted time period onto the one client terminal, and the one client terminal comprising:

a second reception unit constructed to receive the management policy including the usage-permitted time period of the one client terminal from the management server;

a second application unit constructed to apply the management policy to the one client terminal; and a transmission unit constructed to transmit a usage log of the one client terminal to the management server via the network, wherein even when the time period of disuse of the one client terminal exceeds the predetermined time period, when the one client terminal executes uninterruptible processing, the application unit does not apply the usage-permitted time period used to shorten the usage-permitted time period for the one client terminal.

* * * * *